United States Patent [19]
Taniguchi et al.

[11] Patent Number: 5,731,977
[45] Date of Patent: Mar. 24, 1998

[54] AUTOMATIC SPEED CONTROL SYSTEM FOR AUTOMOTIVE VEHICLES

[75] Inventors: Ikuhiro Taniguchi; Hiroshi Satoh, both of Yokosuka; Katsunori Oshiage, Yokohama; Toshio Matsumura, Yokosuka, all of Japan

[73] Assignee: Nissan Motor Co., Ltd., Kanagawa, Japan

[21] Appl. No.: 528,870

[22] Filed: Sep. 15, 1995

[30] Foreign Application Priority Data

Sep. 20, 1994 [JP] Japan .................................. 6-251186

[51] Int. Cl.⁶ .................................................. B60T 8/58
[52] U.S. Cl. .................................. 364/426.044; 364/461; 340/903; 180/169; 180/170
[58] Field of Search .................. 364/426.041, 426.044, 364/460, 461, 431.07; 180/167–170, 176–179; 123/350, 352; 342/454, 455; 340/903, 904

[56] References Cited

U.S. PATENT DOCUMENTS

| | | | |
|---|---|---|---|
| 4,706,195 | 11/1987 | Yoshino et al. | 364/426.044 |
| 5,165,497 | 11/1992 | Chi | 180/169 |
| 5,166,881 | 11/1992 | Akasu | 364/461 |
| 5,197,562 | 3/1993 | Kakinami | 364/426.044 |
| 5,230,400 | 7/1993 | Kakinami | 364/426.044 |
| 5,234,071 | 8/1993 | Kajiwara | 364/426.044 |
| 5,278,764 | 1/1994 | Iizuka et al. | 364/461 |
| 5,400,864 | 3/1995 | Winner et al. | 180/169 |
| 5,594,645 | 1/1997 | Nishimura et al. | 364/426.044 |

FOREIGN PATENT DOCUMENTS

| | | |
|---|---|---|
| 0 484 995 A2 | 5/1992 | European Pat. Off. . |
| 0 612 641 A1 | 8/1994 | European Pat. Off. . |
| 28 19 175 | 11/1979 | Germany . |
| 41 00 993 A1 | 7/1991 | Germany . |
| 40 37 248 A1 | 5/1992 | Germany . |
| 3-295000 | 12/1991 | Japan . |
| 4-201629 | 7/1992 | Japan . |

*Primary Examiner*—Gary Chin
*Attorney, Agent, or Firm*—Lowe, Price, LeBlanc & Becker

[57] ABSTRACT

An automatic speed control system for an automotive vehicle comprises a vehicle-speed sensor, a throttle actuator adjusting an opening angle of a throttle, a brake actuator adjusting a brake-fluid pressure applied to wheel cylinders, and a switching-operation decision unit controlling the switching from one of a driving-force control of the throttle actuator and a braking-force control of the brake actuator to the other. A first arithmetic circuit calculating a command signal value for the throttle actuator and a second arithmetic circuit calculating a command signal value for the brake actuator are designed to provide transition durations. The decision unit acts to continue either one or the other control executed prior to a transition for its transition duration.

12 Claims, 13 Drawing Sheets

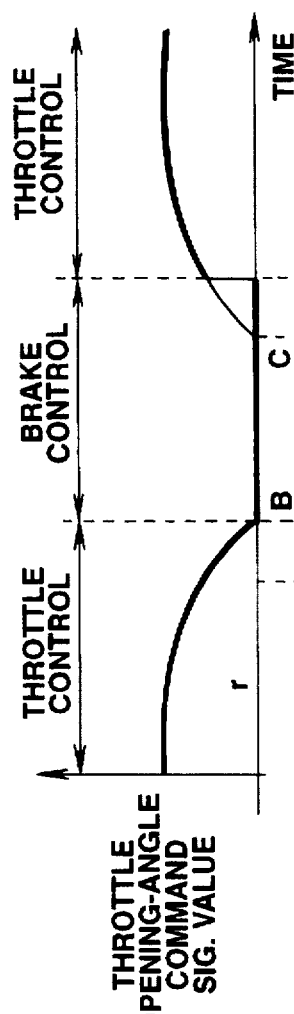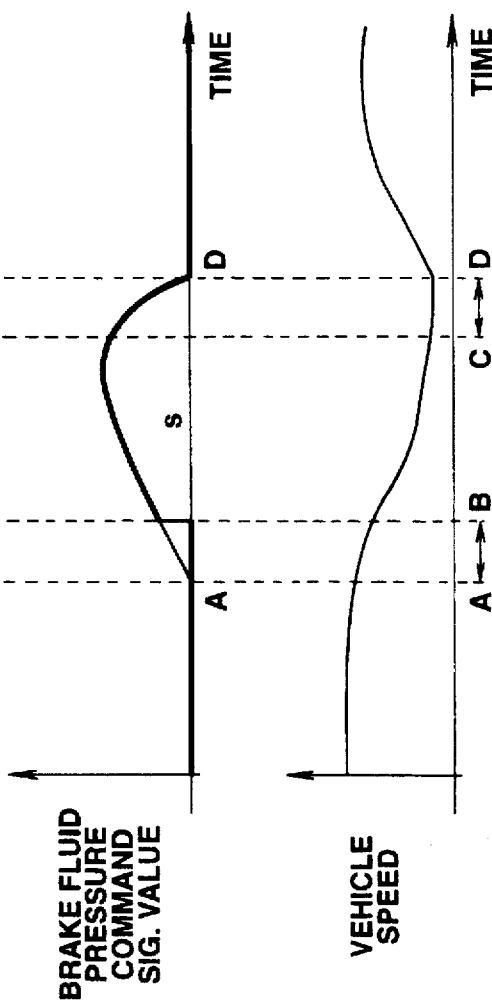

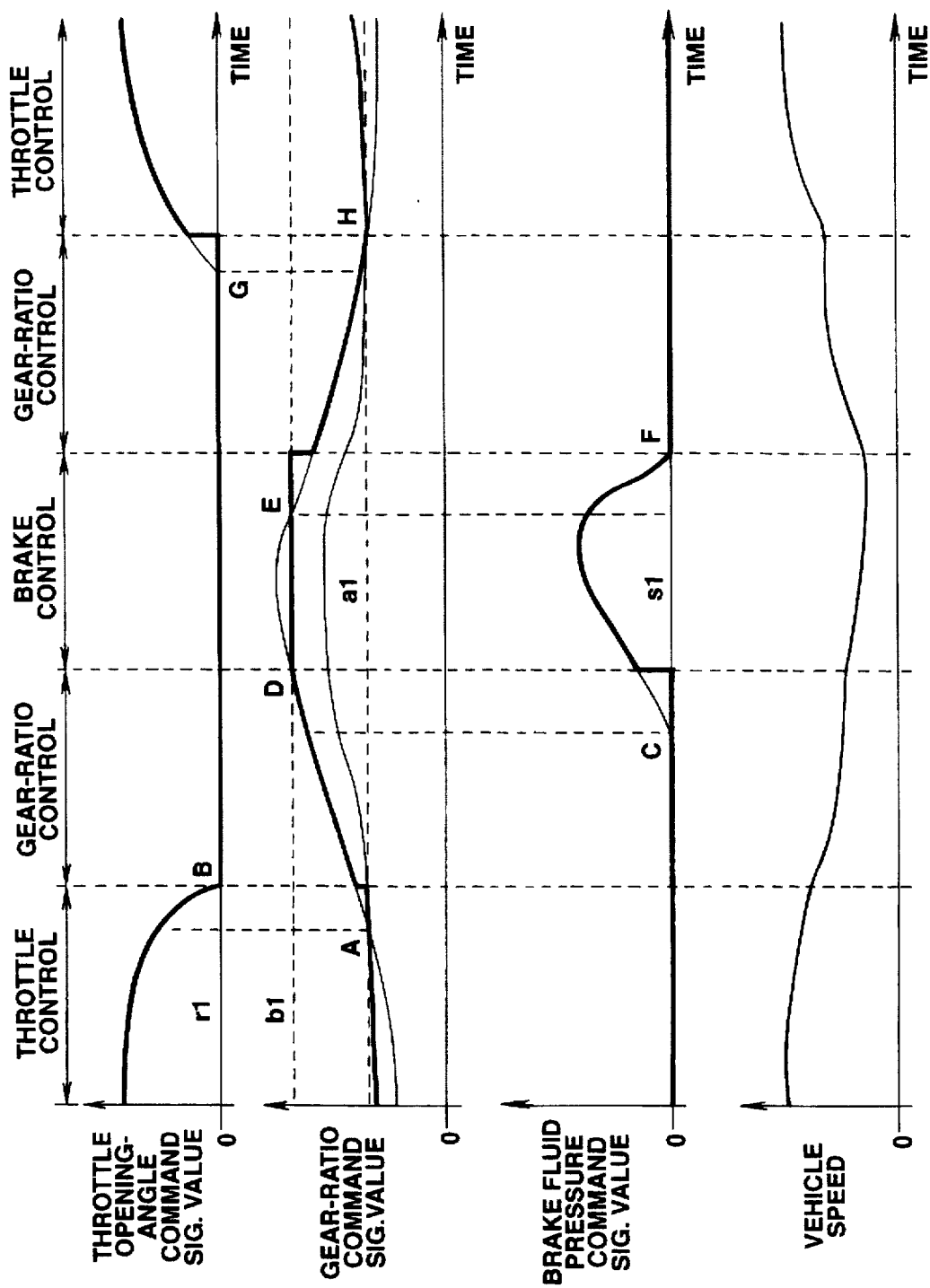

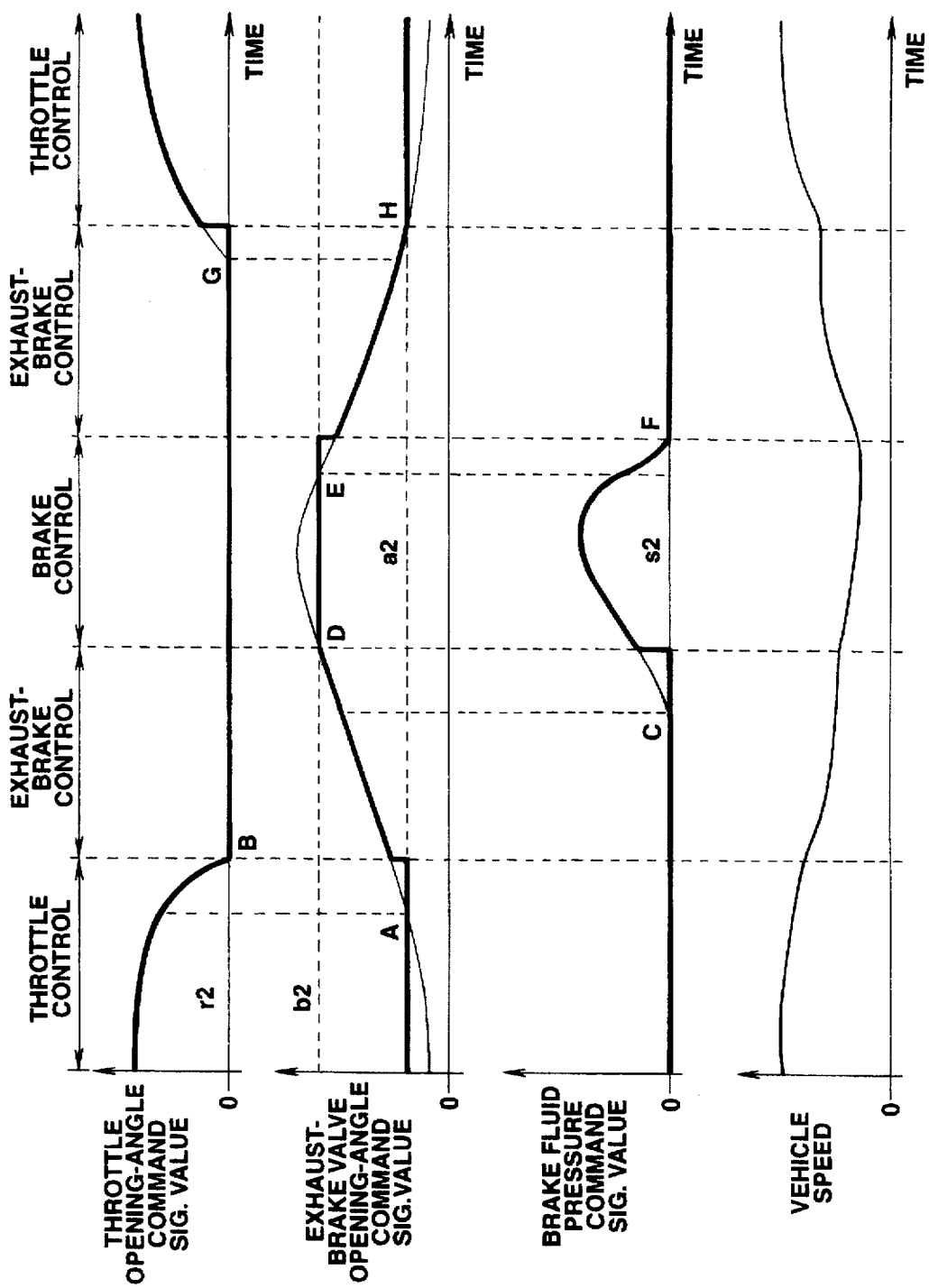

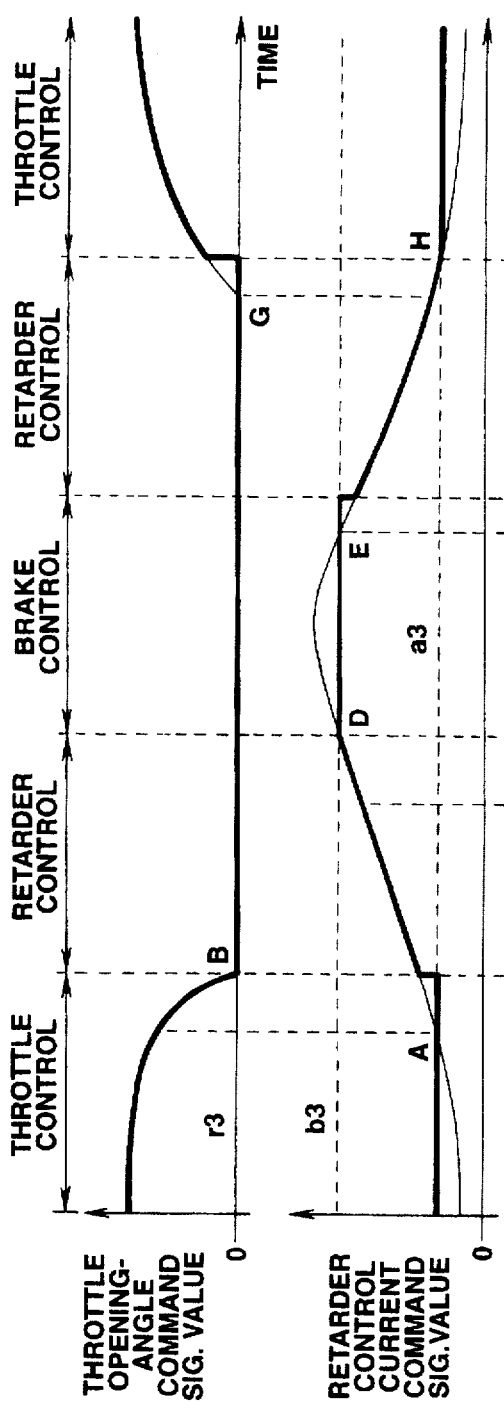
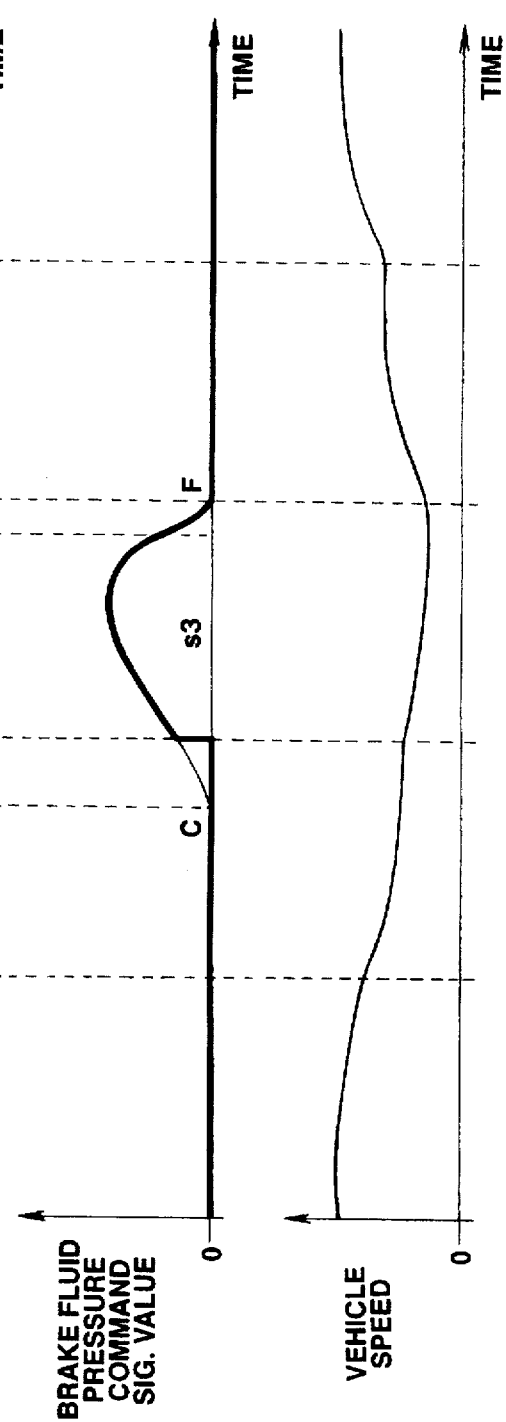
FIG.13(a) THROTTLE OPENING-ANGLE COMMAND SIG. VALUE
FIG.13(b) RETARDER CONTROL CURRENT COMMAND SIG. VALUE
FIG.13(c) BRAKE FLUID PRESSURE COMMAND SIG. VALUE
FIG.13(d) VEHICLE SPEED

AUTOMATIC SPEED CONTROL SYSTEM FOR AUTOMOTIVE VEHICLES

BACKGROUND OF THE INVENTION

1. Field of the Invention

The present invention relates to an automatic speed control system for automotive vehicles for automatically controlling a vehicle speed to a desired speed, and specifically to a system employing at least a main accelerating device, such as a throttle actuator by way of which an opening angle of a throttle is adjusted, and a main decelerating device, such as a brake actuator by way of which a brake-fluid pressure applied to wheel cylinders is adjusted without depression of the brake pedal, for automatically controlling a vehicle speed toward a pre-selected speed and maintaining the pre-selected speed.

2. Description of the Prior Art

Recently, on high-grade cars, an automatic speed control system is often mounted thereon, for automatically adjusting a vehicle speed to a pre-selected speed. One such automatic speed control system has been disclosed in Japanese Patent Provisional Publication No. 4-201629 (See FIG. 15), entitled "Traveling Controller".

Referring now to FIG. 15, the prior art automatic speed control system described in the Japanese Patent Provisional Publication No. 4-201629 comprises a driving force control means consisting of a throttle control device 101 such as a throttle actuator according to which the opening angle of the throttle, i.e., the positive driving force is automatically adjusted without depression of the accelerator pedal, and a brake control device 102 such as a brake actuator according to which the braking force, i.e., the negative driving force is automatically adjusted without depression of the brake pedal. The prior art system also comprises a between-vehicle distance measurement device 103 provided for measuring a between-vehicle distance between a car (of one's own) mounting the automatic speed control system thereon and a preceding car traveling ahead of the car employing the system in the same direction, a vehicle speed sensor 104 provided for measuring the traveling speed of the car employing the system, an accelerator pedal sensor 105 provided for detecting an accel-operation (such as, an opening angle of the throttle, a depression of the accelerator pedal or the like) of a driver of the car employing the system, a brake switch 106 provided for detecting whether the brakes are in operation, an engine speed sensor 107, and a computer unit 108 responsive to input information from the above-noted sensors for shifting the driving mode of the car employing the automatic speed control system from a follow-up mode to a manual mode, or vice versa. In the follow-up mode, the driving force is automatically adjusted in a manner so as to maintain a constant pre-selected target value of the between-vehicle distance between the two cars. In the manual mode, the driving force is controlled manually by the driver. In the prior art system, in the event that it is decided that the between-vehicle distance measurement is not normal during the straight-road driving at the follow-up mode, the vehicle driving mode is switched to a constant-speed driving at a target vehicle speed. The target vehicle speed is set at a vehicle speed, detected at the time when the abnormal between-vehicle distance measurement has been decided. As previously described, the prior art system controls the driving force control means to maintain a pre-selected target between-vehicle distance, while measuring a between-vehicle distance from the car employing the system to the preceding car traveling in front. Also, when the between-vehicle distance measurement is difficult or impossible, i.e., when the preceding car is accelerated quickly and goes far away from the car employing the automatic speed control system, or during driving on curved roads, the constant-speed driving mode is reached from the follow-up mode. This may reduce the driver's fatigue even during long-distance touring. In the above-noted conventional automatic speed control system, a controlled driving force is calculated in accordance with the following expression (1).

$$DF = K1 \times (d_M - d_T) + K2 \times V \quad (1)$$

where DF denotes a controlled driving force, K1 and K2 are constants, $d_M$ denotes a between-vehicle distance measured, $d_T$ denotes a pre-selected target between-vehicle distance, and V denotes a relative speed of the preceding car to the car employing the automatic speed control system.

In case that the driving force derived from the expression (1) is positive, the derived driving force is converted to a target opening angle of the throttle, so as to increasingly compensate a longitudinal acceleration (the positive driving force) exerted on the vehicle body. In contrast, in case that the derived driving force has a minus sign, the derived driving force is converted to a target value of the hydraulic pressure fed from the master cylinder to the wheel cylinders, so as to increasingly compensate a braking force (the negative driving force).

As is generally known, according to a usual decelerating method, the throttle is closed slightly or the brakes may by actually applied in lieu thereof. In accordance with a usual accelerating method, the brakes are released slightly or the throttle may be further opened. However, in the prior art system, the switching operation between the throttle control and the brake control is actually performed according to whether the sign of the derived driving force, which force is based on the measured between-vehicle distance $d_M$ and the relative speed V, has a plus sign or a minus sign. Thus, the prior art system may act to control the driving force control means so that the throttle is fully closed by the throttle actuator 101 and thereafter the brakes are applied by the brake actuator 102, even when it is desired to reduce the vehicle speed only by slightly closing the throttle. Additionally, the prior art system may act to control the driving force control means so that the brakes are completely released and thereafter the throttle is opened soon, even when it is desired to moderately accelerate the vehicle by slightly releasing the brakes. In particular, when the vehicle comes to an upward slope or a downward slope, such a sudden switching operation between the throttle control and the brake control is remarkable in the prior art system. In case of the traveling on the upward slope, the vehicle is traveling with a comparatively great opening angle of the throttle. Under this condition, when it is required to reduce the vehicle speed by slightly closing the throttle, i.e., when the preceding car is decelerated slightly during the up-slope driving, a value of the derived driving force will be changed to a minus value. When changed to the minus value, the prior art system will control both the brake actuator and the throttle actuator such that the throttle is quickly closed and then the brakes are applied soon. Thus, the derived driving force tends to be changed again to a plus value at a relatively short time interval. At this time, the prior art system will control the two actuators such that the brakes are quickly released and then the throttle is opened again. In case of the traveling on the downward slope, the vehicle is traveling with a comparatively great depressing amount of the brake pedal. Under this condition, when it is required to accelerate the vehicle by slightly releasing the brakes, i.e., when the preceding car is accelerated slightly during the down-slope driving, a value of the derived driving force will be changed to a plus value. When changed to the plus value, the prior art system will control the two actuators 101 and 102 such that the brakes are quickly released and then the throttle is opened at once. Thus, the derived driving force tends to be changed again to a minus value at a relatively short time interval. Thereafter, the prior art system will control the two actuators such that the throttle is quickly closed and then the brakes are applied again. As set forth above, the conventional automatic speed control system suffers from the drawback that the system cannot provide a smooth auto-speed controlling operation particularly during the up-slope driving or the down-slope driving.

Additionally, when the previously-noted relative speed is substantially equal to zero, and the car employing the prior art system is traveling at the follow-up mode, maintaining the measured between-vehicle distance substantially equal to the pre-selected target distance, there is a possibility of undesirable hunting, resulting from instability of the prior art automatic speed control system, wherein the controlled driving force swings on both sides of the desired value of zero, i.e., the controlled driving force repeatedly changes between a small positive value and a small negative value, owing to a compensation for a slight offset of the measured between-vehicle distance with respect to the pre-selected target between-vehicle distance. As appreciated, it is difficult to smoothly compensate the above-noted slight offset between the measured between-vehicle distance and the pre-selected target between-vehicle distance.

SUMMARY OF THE INVENTION

Accordingly, it is an object of the invention to provide an improved automatic speed control system for automotive vehicles which avoids the foregoing disadvantages of the prior art.

It is another object of the invention to provide an improved automatic speed control system for automotive vehicles which can provide a smooth auto speed control during operation.

It is a further object of the invention to avoid undesirable hunting during operation of an automatic speed control system.

In order to accomplish the aforementioned and other objects of the invention, an automatic speed control system for an automotive vehicle, comprises detection means for detecting a vehicle speed of the vehicle, acceleration means for providing an increased acceleration exerted on the vehicle by automatically adjusting a driving force applied to road wheels, deceleration means for providing an increased deceleration exerted on the vehicle by automatically adjusting a braking force applied to the road wheels, first arithmetic means for calculating a value of a first command signal to be sent to the acceleration means, based on a target vehicle speed and the vehicle speed detected by the detection means, second arithmetic means for calculating a value of a second command signal to be sent to the deceleration means, based on the target vehicle speed and the vehicle speed detected by the detection means, and decision means for switching from one of a driving-force control of the acceleration means and a braking-force control of the deceleration means to another control, so that, during the driving-force control, the driving-force control is continued until the value of the first command signal reaches a first predetermined threshold and the driving-force control is switched to the braking-force control when the first predetermined threshold is reached, and so that, during the braking-force control, the braking-force control is continued until the value of the second command signal reaches a second predetermined threshold and the braking-force control is switched to the driving-force control when the second predetermined threshold is reached, in case of a simultaneous occurrence of the first command signal having a value greater than the first predetermined threshold and the second command signal having a value greater than the second predetermined threshold.

According to another aspect of the invention, an automatic speed control system for an automotive vehicle, comprises detection means for detecting a vehicle speed of the vehicle, acceleration means for providing an increased acceleration exerted on the vehicle by automatically adjusting a driving force applied to road wheels, deceleration means for providing an increased deceleration exerted on the vehicle by automatically adjusting a braking force applied to the road wheels, first arithmetic means for calculating a value of a first command signal to be sent to the acceleration means, based on a target vehicle speed and the vehicle speed detected by the detection means, second arithmetic means for calculating a value of a second command signal to be sent to the deceleration means, based on the target vehicle speed and the vehicle speed detected by the detection means, and decision means for switching from one of a driving-force control of the acceleration means and a braking-force control of the deceleration means to another control. A first group of control gains used in the first arithmetic means and a second group of control gains used in the second arithmetic means are preset to provide transition durations in which the first command signal having a value greater than a first predetermined threshold and the second command signal having a value greater than a second predetermined threshold occur concurrently. The decision means selectively outputs either one of the first and second command signals to continue either one of the driving-force control and the braking-force control, executed prior to a transition, for each of the transition durations.

According to a further aspect of the invention, an automatic speed control system for an automotive vehicle, comprises detection means for detecting a vehicle speed of the vehicle, acceleration means for providing an increased acceleration exerted on the vehicle by automatically adjusting a driving force applied to road wheels, deceleration means for providing an increased deceleration exerted on the vehicle by automatically adjusting a braking force applied to the road wheels, first arithmetic means for calculating a value of a first command signal to be sent to the acceleration means, based on a target vehicle speed and the vehicle speed detected by the detection means, second arithmetic means for calculating a value of a second command signal to be sent to the deceleration means, based on the target vehicle speed and the vehicle speed detected by the detection means, and decision means for switching from one of a driving-force control of the acceleration means and a braking-force control of the deceleration means to another control. A first group of control gains used in the first arithmetic means and a second group of control gains used in the second arithmetic means are preset to provide transition durations in which the first command signal having a value greater than a first predetermined threshold and the second command signal having a value greater than a second predetermined threshold occur concurrently. The driving-force control is continued for the transition duration in which the value of the first command signal is decreasingly controlled toward the first predetermined threshold and then the driving-force control is switched to the braking-force control when the first predetermined threshold is reached, and the braking-force control is continued for the transition duration in which the value of the second command signal is decreasingly controlled toward the second predetermined threshold and then the braking-force control is switched to the driving-force control when the second predetermined threshold is reached. The first and second arithmetic means may calculate the respective values of the first and second command signals from equations:

$$\theta = Kp \times (V-Vd) + Ki \times \int (V-Vd)dt + Kd \times dV/dt$$

$$P = Ka \times (V-Vd) + Kb \times \int (V-Vd)dt + Kc \times dV/dt$$

where θ denotes the value of the first command signal indicative of the opening angle of the throttle, V denotes the vehicle speed detected by the detection means, Vd denotes the target vehicle speed, three coefficients Kp, Ki and Kd denote the first group of control gains, P denotes the value of the second command signal indicative of the controlled brake fluid pressure, and three coefficients Ka, Kb and Kc denote the second group of control gains.

According to a still further aspect of the invention, an automatic speed control system for an automotive vehicle, comprises detection means for detecting a vehicle speed of the vehicle, acceleration means for providing an increased acceleration exerted on the vehicle by automatically adjusting a driving force applied to road wheels, main deceleration means fluidly connected to a hydraulic brake system for providing an increased deceleration exerted on the vehicle by automatically adjusting a braking force applied to the road wheels, auxiliary deceleration means for producing an auxiliary braking force applied to the road wheels without utilizing the hydraulic brake system, first arithmetic means for calculating a value of a first command signal to be sent to the acceleration means, based on a target vehicle speed and the vehicle speed detected by the detection means, second arithmetic means for calculating a value of a second command signal to be sent to the main deceleration means, based on the target vehicle speed and the vehicle speed detected by the detection means, third arithmetic means for calculating a value of a third command signal to be sent to the auxiliary deceleration means, based on the target vehicle speed and the vehicle speed detected by the detection means, and decision means for switching from one of a driving-force control of the acceleration means and an auxiliary braking-force control of the auxiliary deceleration means to another control, and for switching from one of the auxiliary braking-force control of the auxiliary deceleration means and a braking-force control of the main deceleration means to another control, so that, during the driving-force control, the driving-force control is continued until the value of the first command signal reaches a first predetermined threshold and the driving-force control is switched to the auxiliary braking-force control when the first predetermined threshold is reached, and so that, during the auxiliary braking-force control, the auxiliary braking-force control is continued until the value of the third command signal reaches either upper and lower predetermined thresholds and the auxiliary braking-force control is switched to the driving-force control when the upper predetermined threshold is reached and to the braking-force control when the lower predetermined threshold is reached, and so that, during the braking-force control, the braking-force control is continued until the value of the second command signal reaches a second predetermined threshold and the braking-force control is switched to the auxiliary braking-force control when the second predetermined threshold is reached, in case of a simultaneous occurrence of the first command signal having a value greater than the first predetermined threshold and the third command signal having a value greater than the lower predetermined threshold or in case of a simultaneous occurrence of the second command signal having a value greater than the second predetermined threshold and the third command signal having a value greater than the upper predetermined threshold. The system acceleration means may comprise a throttle actuator which variably adjusts an opening angle of a throttle, and the main deceleration means may comprise a brake actuator which supplies a controlled brake fluid pressure to wheel cylinders by an external fluid pressure source, and the auxiliary deceleration means may comprise an automatic gearchange system which automatically changes a gear ratio. The auxiliary deceleration means may comprise an exhaust brake system which constricts a flow of exhaust gases coming from an engine to increase an exhaust back pressure. Alternatively, the auxiliary deceleration means may comprise an electric retarder which converts a part of the driving torque to electric energy.

According to another aspect of the invention, an automatic speed control system for an automotive Vehicle, comprises detection means for detecting a vehicle speed of the vehicle, acceleration means for providing an increased acceleration exerted on the vehicle by automatically adjusting a driving force applied to road wheels, main deceleration means for providing an increased deceleration exerted on the vehicle by automatically adjusting a braking force applied to the road wheels, auxiliary deceleration means for producing an auxiliary braking force applied to the road wheels without utilizing the hydraulic brake system, first arithmetic means for calculating a value of a first command signal to be sent to the acceleration means, based on a target vehicle speed and the vehicle speed detected by the detection means, second arithmetic means for calculating a value of a second command signal to be sent to the main deceleration means, based on the target vehicle speed and the vehicle speed detected by the detection means, third arithmetic means for calculating a value of a third command signal to be sent to the auxiliary deceleration means, based on the target vehicle speed and the vehicle speed detected by the detection means, and decision means for switching from one of a driving-force control of the acceleration means and an auxiliary braking-force control of the auxiliary deceleration means to another control, and for switching from one of the auxiliary braking-force control of the auxiliary deceleration means and a braking-force control of the main deceleration means to another control. A first group of control gains used in the first arithmetic means and a third group of control gains used in the third arithmetic means are preset to provide first transition durations between the driving-force control and the auxiliary braking-force control in which durations the first command signal having a value greater than a first predetermined threshold and the third command signal having a value greater than a lower predetermined threshold occur concurrently, and the third group of control gains used in the third arithmetic means and a second group of control gains used in the second arithmetic means are preset to provide second transition durations between the auxiliary braking-force control and the braking-force control in which durations the third command signal having a value greater than an upper predetermined threshold and the second command signal having a value greater than a second predetermined threshold occur concurrently. The decision means selectively outputs either one of the first, second and third command signals to continue either one of the driving-force control, the auxiliary driving-force control and the braking-force control, executed prior to a transition, for each of the first and second transition durations.

According to a further aspect of the invention, an automatic speed control system for an automotive vehicle, comprises detection means for detecting a vehicle speed of the vehicle, acceleration means for providing an increased acceleration exerted on the vehicle by automatically adjusting a driving force applied to road wheels, main deceleration means for providing an increased deceleration exerted on the vehicle by automatically adjusting a braking force applied to the road wheels, auxiliary deceleration means for producing an auxiliary braking force applied to the road wheels without utilizing the hydraulic brake system, first arithmetic means for calculating a value of a first command signal to be sent to the acceleration means, based on a target vehicle speed and the vehicle speed detected by the detection means, second arithmetic means for calculating a value of a second command signal to be sent to the main deceleration means, based on the target vehicle speed and the vehicle speed detected by the detection means, third arithmetic means for calculating a value of a third command signal to be sent to the auxiliary deceleration means, based on the target vehicle speed and the vehicle speed detected by the detection means, and decision means for switching from one of a driving-force control of the acceleration means and an auxiliary braking-force control of the auxiliary deceleration means to another control, and for switching from one of the auxiliary braking-force control of the auxiliary deceleration means and a braking-force control of the main deceleration means to another control. A first group of control gains used in the first arithmetic means and a third group of control gains used in the third arithmetic means are preset to provide first transition durations between the driving-force control and the auxiliary braking-force control in which durations the first command signal having a value greater than a first predetermined threshold and the third command signal having a value greater than a lower predetermined threshold occur concurrently, and the third group of control gains used in the third arithmetic means and a second group of control gains used in the second arithmetic means are preset to provide second transition durations between the auxiliary braking-force control and the braking-force control in which durations the third command signal having a value greater than an upper predetermined threshold and the second command signal having a value greater than a second predetermined threshold occur concurrently. The driving-force control is continued for the first transition duration in which the value of the first command signal is decreasingly controlled toward the first predetermined threshold and then the driving-force control is switched to the auxiliary braking-force control when the first predetermined threshold is reached, and the auxiliary braking-force control is continued for the first transition duration in which the value of the third command signal is decreasingly controlled toward the lower predetermined threshold and then the auxiliary braking-force control is switched to the driving-force control when the lower predetermined threshold is reached. The auxiliary braking-force control is continued for the second transition duration in which the value of the third command signal is increasingly controlled toward the upper predetermined threshold and then the auxiliary braking-force control is switched to the braking-force control when the upper predetermined threshold is reached, and the braking-force control is continued for the second transition duration in which the value of the second command signal is decreasingly controlled toward the second predetermined threshold and then the braking-force control is switched to the auxiliary braking-force control when the second predetermined threshold is reached.

Each of the first and second transition durations is variable depending on a degree of a demand for acceleration or deceleration so that each of the first and second transition durations is reduced to a minimum in case of a high demand for acceleration or deceleration.

BRIEF DESCRIPTION OF THE DRAWINGS

FIGS. 3(a), 3(b) and 3(c) are a timing chart illustrating the relationship between a controlled opening angle of the throttle, a controlled depressing pressure of the brake pedal or a controlled hydraulic pressure from the master cylinder to the wheel cylinders, and a controlled vehicle speed.

FIGS. 7(a), 7(b), 7(c) and 7(d) are a timing chart illustrating the relationship between a controlled opening angle of the throttle, a controlled gear ratio, a controlled hydraulic pressure, and a controlled vehicle speed in the system of the second embodiment.

FIGS. 10(a), 10(b) 10(c) and 10(d) are a timing chart illustrating the relationship between a controlled opening angle of the throttle, a controlled opening angle of the exhaust-brake valve, a controlled hydraulic pressure, and a controlled vehicle speed in the system of the third embodiment.

FIGS. 13(a), 13(b), 13(c) and 13(d) are a timing chart illustrating the relationship between a controlled opening angle of the throttle, a controlled current value applied to the retarder, a controlled hydraulic pressure, and a controlled vehicle speed in the system of the fourth embodiment.

DESCRIPTION OF THE PREFERRED EMBODIMENTS

First embodiment

Figure 1:
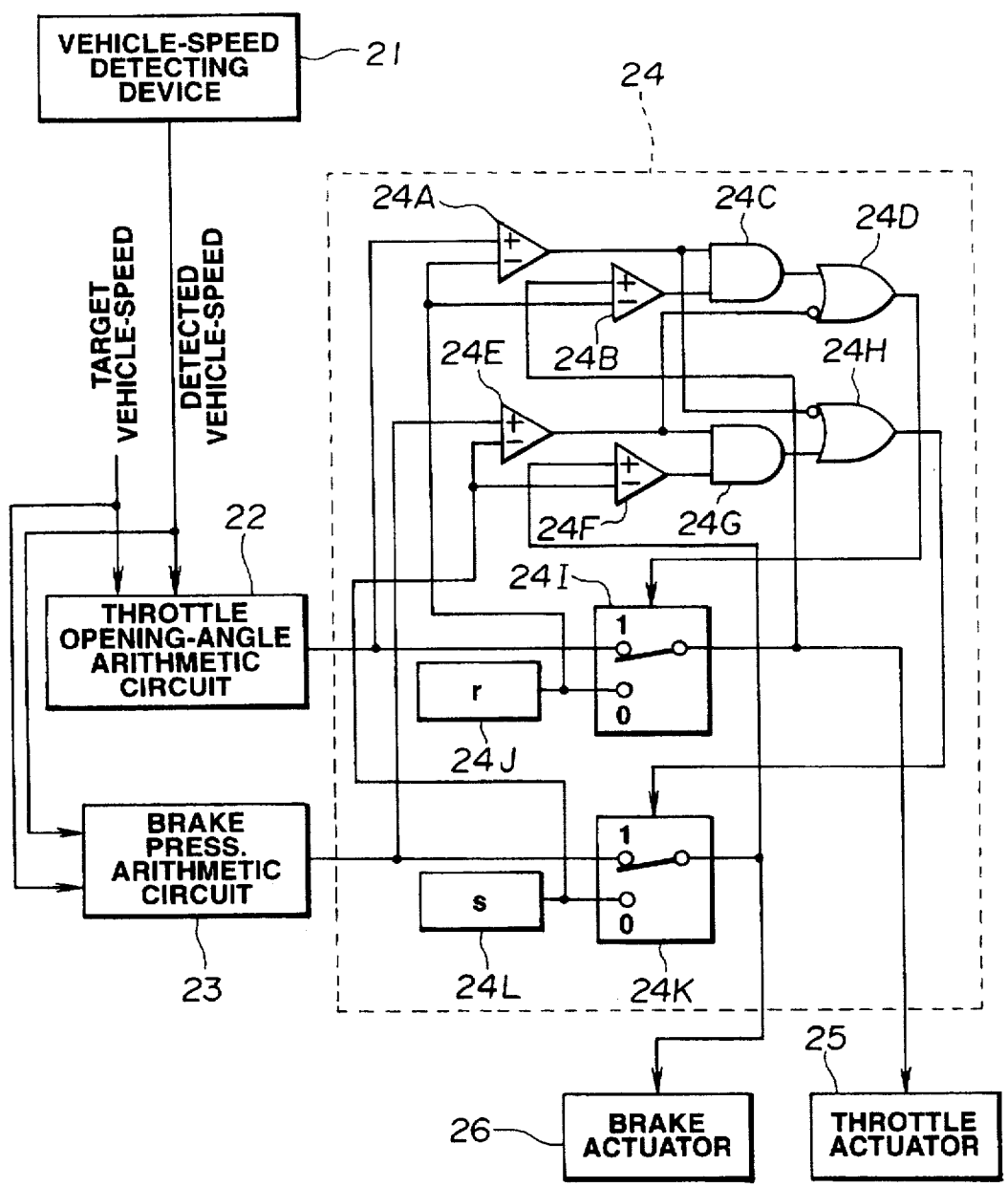
FIG. 1 is a circuit diagram illustrating a first embodiment of an automatic speed control system according to the invention.

Referring now to the drawings, particularly to FIG. 1, the automatic speed control system of the present invention includes a vehicle-speed detecting device 21 consisting of a plurality of wheel-speed sensors, which device detects a vehicle speed based on signals from the wheel-speed sensors, and a throttle actuator 25 and a brake actuator 26, both actuators controlling a driving force and a braking force applied to road wheels so that the detected vehicle speed is adjusted to a target vehicle speed. In the embodiments, the throttle actuator 25 may comprise a vacuum pump unit traditionally consisting of a motor-driven vacuum pump, a solenoid-operated air valve, a solenoid-operated release valve, and a wire connected to an accelerator wire. On the other hand, the brake actuator 26 may comprise such a hydraulic system as will be used in a conventional traction control system with an external brake fluid pressure source. The automatic speed control system also includes a throttle opening-angle arithmetic circuit 22, a hydraulic pressure (brake-fluid pressure) arithmetic circuit 23, and a switching-operation decision unit 24. The switching-operation decision unit 24 is provided for switching between the throttle control and the brake control and for controlling the transition timing from the throttle control to the brake control or vice versa, as detailed later. The throttle opening-angle arithmetic circuit 22 functions to calculate a command signal value of the throttle opening-angle on the basis of the detected vehicle speed and the target vehicle speed, whereas the hydraulic pressure arithmetic circuit 23 functions to calculate a command signal value of the brake-fluid pressure for the wheel-cylinder operated brake on the basis of the detected vehicle speed and the target vehicle speed. In the embodiments, although the brake actuator is exemplified in case of a hydraulic means, the brake actuator may be a mechanical means which mechanically actuates the brake pedal to adjust a depressing pressure of the brake pedal. In this case, the hydraulic pressure arithmetic circuit 23 will be replaced with a brake-pedal depressing-pressure arithmetic circuit. In the shown embodiments, an automatic throttle control executed by the throttle actuator will be hereinafter abbreviated merely to a "throttle control", while an automatic brake control executed by the brake actuator will be hereinafter abbreviated merely to a "brake control". The above-noted target vehicle speed is dependent on selected driving modes, for instance a constant-speed driving mode in which the target vehicle speed is set at a constant pre-set speed determined by the driver, a resume mode in which the target vehicle speed is gradually adjusted to a pre-set speed determined by the driver with a constant acceleration, a follow-up driving mode in which the target vehicle speed is derived in such a manner as to maintain a pre-selected target between-vehicle distance between a car (of one's own) mounting the automatic speed control system thereon and a preceding car traveling ahead of the car in the same direction. In case of the follow-up mode, the target between-vehicle distance is derived from the following equation, for example.

$$Ld=0.4V+20$$

where Ld denotes a target between-vehicle distance, and V denotes a detected vehicle speed.

In the follow-up mode, a target vehicle speed Vd is derived from the following equation, for example.

$$Vd=Fp\times(L-Ld)+Fd\times Vrlt+Vp$$

where each of Fp and Fd denotes a control gain, L denotes a detected between-vehicle distance, Vrlt denotes a relative distance of the preceding car to the car with the automatic speed control system, Ld denotes a target between-vehicle distance, and Vp denotes a velocity of the preceding car.

On the basis of the above-noted target vehicle speed Vd determined by the driver or derived to maintain the pre-selected between-vehicle distance, the throttle opening-angle arithmetic circuit 22 and the hydraulic pressure arithmetic circuit 23 respectively calculates a throttle opening-angle command signal value and a hydraulic pressure command signal value, in accordance with the following equations (2) and (3).

$$\theta=Kp\times(V-Vd)+Ki\times\int(V-Vd)dt+Kd\times dV/dt \quad (2)$$

$$P=Ka\times(V-Vd)+Kb\times\int(V-Vd)dt+Kc\times dV/dt \quad (3)$$

where θ denotes a calculated throttle opening angle command signal value, V denotes the detected vehicle speed, Vd denotes the target vehicle speed, three coefficients Kp, Ki and Kd denote control gains experimentally determined by the inventors of the present invention for calculation of a proper throttle opening-angle command signal value for the throttle actuator, P denotes a calculated hydraulic pressure command signal value, and three coefficients Ka, Kb and Kc denote control gains experimentally determined by the inventors for calculation of a proper hydraulic pressure command signal value for the brake actuator. In the system of the first embodiment, the two sets of control gains (Kp, Ki, Kd) and (Ka, Kb, Kc) are selected to provide a transition duration (as detailed later) from the throttle control to the brake control or vice versa in order to ensure a smooth transition, and thus providing a smooth auto speed control.

Figure 2:
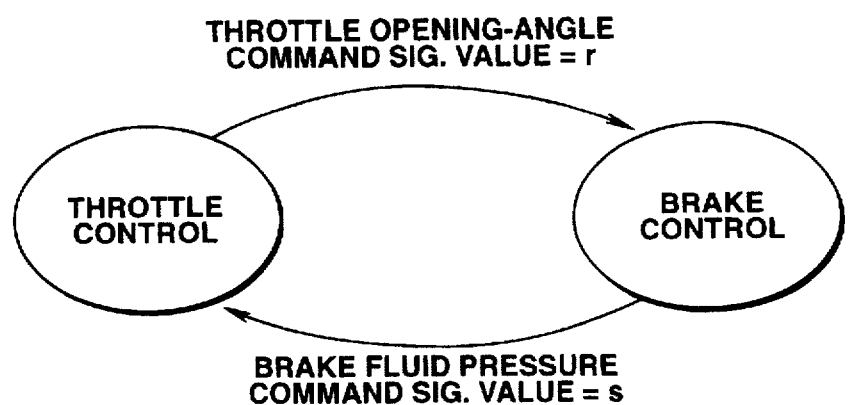
FIG. 2 is a transition diagram explaining a switching operation between a throttle control and a wheel-cylinder brake control in the system of the first embodiment.

Referring to FIG. 2, there is shown the transition diagram explaining the necessary condition for transition from a throttle control for the throttle actuator 25 to a brake control for the brake actuator, or vice versa. During the throttle control, the throttle actuator 25 actuates the throttle in accordance with a command signal value of the throttle opening-angle calculated by the throttle opening-degree arithmetic circuit 22. During the brake control, the brake actuator 26 actuates the hydraulic brake (the wheel-cylinder operated brake) in accordance with a command signal value of the hydraulic pressure calculated by the hydraulic pressure arithmetic circuit 23 in the conventional manner. The above-noted throttle control and the brake control are well known. In the system made according to the invention, provided are a predetermined threshold r for a final command signal value of the throttle opening-angle, finally output through the decision unit 24 to the throttle actuator 25, and a predetermined threshold s for a final command signal value of the hydraulic pressure, finally output through the decision unit 24 to the brake actuator 26. As appreciated from the following explanation, note that the calculated throttle opening-angle command signal value is different from the final throttle opening-angle command signal value, and the calculated hydraulic pressure command signal value is different from the final hydraulic pressure command signal value. As seen in FIG. 2, even when the calculated command signal value of the hydraulic pressure becomes above the predetermined threshold s (zero) during the throttle control, the throttle control is continued until the calculated command signal value of the throttle opening-angle has been reached the predetermined threshold r. When the predetermined threshold r is reached, the control mode is shifted from the throttle control to the brake control. In contrast to the above, even when the calculated command signal value of the throttle opening-angle becomes above the predetermined threshold r (zero) during the brake control, the brake control is continued until the calculated command signal value of the hydraulic pressure has been reached the predetermined threshold s. When the predetermined threshold s is reached, the control mode is shifted from the brake control to the throttle control.

Returning to FIG. 1, the transition-timing/switching-operation decision unit 24 employed in the system of the first embodiment comprises two pairs of comparators (24A; 24B) and (24E; 24F), a first threshold setting circuit 24J, a second threshold setting circuit 24L, a throttle opening-angle selector 24I, a hydraulic pressure selector 24K, a first AND gate 24C, a second AND gate 24G, a first OR gate 24D and a second OR gate 24H. The first threshold setting circuit 24J is provided for setting the predetermined threshold r for the opening angle of the throttle, whereas the second threshold setting circuit 24L is provided for the predetermined threshold s for the hydraulic pressure. The throttle opening-angle selector 24I receives the output signal from the OR gate 24D as a pilot signal, and functions to select one of the calculated throttle opening-angle command signal value from the throttle opening-angle arithmetic circuit 22 and the predetermined threshold r preset by the first threshold setting circuit 24J, depending on a signal value of the output signal from the OR gate 24D. On the other hand, the hydraulic pressure selector 24K receives the output signal from the OR gate 24H as a pilot signal, and functions to select one of the calculated hydraulic pressure command signal value from the hydraulic pressure arithmetic circuit 23 and the predetermined threshold s preset by the second threshold setting circuit 24L, depending on a value of the output signal from the OR gate 24H. In the shown embodiment, when the OR gate 24D outputs a binary signal "1", the first selector 24I selects the calculated throttle opening-angle command signal from the arithmetic circuit 22 as a drive signal to be supplied to the throttle actuator 25. When the OR gate 24D outputs a binary signal "0", the first selector 24I selects the predetermined threshold r from the first setting circuit 24J, so as to de-energize the throttle actuator 25. Similarly, the second selector 24K selects the calculated hydraulic pressure command signal from the arithmetic circuit 23 as a drive signal for the brake actuator 26, when the OR gate 24H outputs a binary signal "1". When the OR gate 24H outputs a binary signal "0", the second selector 24K selects the predetermined threshold s from the second setting circuit 24L, so as to de-energize the brake actuator 26. In the shown embodiment, the predetermined thresholds r and s are both set at "0". The comparator 24A compares the calculated throttle opening-angle command signal value from the arithmetic circuit 22 with the predetermined threshold r, and outputs a binary signal "1" when the calculated throttle opening-angle command signal value is above the predetermined threshold r, and outputs a binary "0" when the calculated throttle opening-angle command signal value is below the predetermined threshold r. The comparator 24B compares the selected command signal value from the first selector 24I with the predetermined threshold r, and outputs a binary signal "1" when the selected command signal value is above the predetermined threshold r, and outputs a binary "0" when the selected command signal value is below the predetermined threshold r. On the other hand, the comparator 24E compares the calculated hydraulic pressure command signal value from the arithmetic circuit 23 with the predetermined threshold s, and outputs a binary signal "1" when the calculated hydraulic pressure command signal value is above the predetermined threshold s, and outputs a binary "0" when the calculated hydraulic pressure command signal value is below the predetermined threshold s. The comparator 24F compares the selected command signal value from the second selector 24K with the predetermined threshold s, and outputs a binary signal "1" when the selected command signal value is above the predetermined threshold s, and outputs a binary signal "0" when the selected command signal value is below the predetermined threshold s.

As appreciated, during the throttle control, i.e., during operation of the throttle actuator 25, since the calculated throttle opening-angle command signal value is above the predetermined threshold r, the comparator 24A outputs a binary signal "1" Additionally, since the first selector 24I selects the calculated throttle opening-angle command signal as a drive signal for the throttle actuator 25, the comparator 24B also outputs the binary signal "1". Thus, the AND gate 24C receives the two binary signals "1" from the comparators 24A and 24B and outputs a binary signal "1". In contrast, during the brake control, i.e., during operation of the brake actuator 26, since the calculated throttle opening-angle command signal value is below the predetermined threshold r essentially in the middle of the brake control, and may be above the predetermined threshold r at the end of the brake control, the comparator 24A thus outputs the binary signal "1" or "0". During the brake control, since the first selector 24I selects the predetermined threshold r as its output signal value, the comparator 24B consequently outputs the binary signal "0". Thus, the AND gate 24C outputs a binary signal "0". That is, the binary signal "1" output from the AND gate 24C means that the throttle actuator 25 has already been operative. During the brake control, i.e., during operation of the brake actuator 26, since the calculated hydraulic pressure command signal value is above the predetermined threshold s, the comparator 24E outputs the binary signal "1". Since the second selector 24K selects the calculated hydraulic pressure command signal as a drive signal for the brake actuator 26, the comparator 24F also outputs the binary signal "1". Thus, the AND gate 24G receives the two binary signals "1" from the comparators 24E and 24F and outputs a binary signal "1". In contrast, during the throttle control, since the calculated hydraulic pressure command signal value is below the predetermined threshold s in the middle of the throttle control, and may be above the predetermined threshold s at the end of the throttle control, the comparator 24E outputs the binary signal "1" or "0". During the throttle control, since the second selector 24K selects the predetermined threshold s as its output signal value, the comparator 24F outputs the binary signal "0". Thus, the AND gate 24G outputs a binary signal "0". That is, the binary signal "1" output from the AND gate 24G means that the brake actuator 26 has already been operative. As appreciated from the above, the selected command signal from the first selector 24I corresponds to the final throttle opening-angle command signal to be supplied to the throttle actuator 25, while the selected command signal from the second selector 24K corresponds to the final hydraulic pressure command signal to be supplied to the brake actuator 26.

On the other hand, the OR gate 24D receives the binary signal from the AND gate 24C and the inverted signal of the binary signal from the comparator 24E, and outputs a binary signal "1" when at least one of the received binary signal values is "1". For instance, when the AND gate 24C outputs the binary signal "1", that is, when the throttle actuator 25 has already been operative, the OR gate 24D outputs the binary signal "1" to a pilot terminal of the first selector 24I, so as to output the calculated throttle opening-angle command signal from the arithmetic circuit 22 to the throttle actuator 25. Also, when the predetermined threshold s is reached and the calculated hydraulic pressure command signal value becomes less than the predetermined threshold s, the output signal from the comparator 24E is changed from the binary signal "1" to the binary signal "0", and then the OR gate 24D receives the inverted signal "1" of the binary signal "0" from the comparator 24E. In this case, the OR gate 24D also outputs the binary signal "1" to the first selector 24I, and as a result the switching-operation decision unit 24 outputs the calculated throttle opening-angle command signal from the arithmetic circuit 22 to the throttle actuator 25. That is, the OR gate 24D is provided to decide as to whether the throttle actuator 25 has already been operative, or as to whether the predetermined threshold s for the calculated hydraulic pressure command signal becomes reached. In other words, the binary signal "1" output from the OR gate 24D means that the throttle actuator 25 has already been operative or that the predetermined threshold s is reached and the calculated hydraulic pressure command signal value becomes less than the predetermined threshold s. Likewise, the OR gate 24H receives the binary signal from the AND gate 24G and the inverted signal of the binary signal from the comparator 24A, and outputs a binary signal "1" when at least one of the received binary signal values is "1". For example, when the AND gate 24G outputs the binary signal "1", that is, when the brake actuator 26 has already been operative, the OR gate 24H outputs the binary signal "1" to a pilot terminal of the second selector 24K, so as to output the calculated hydraulic pressure command signal from the arithmetic circuit 23 to the brake actuator 26. Similarly, when the predetermined threshold r is reached and the calculated throttle opening-angle command signal value becomes less than the predetermined threshold r, the output signal from the comparator 24A is changed from the binary signal "1" to the binary signal "0", and then the OR gate 24H receives the inverted signal "1" of the binary signal "0" from the comparator 24A. In this case, the OR gate 24H also outputs the binary signal "1" to the second selector 24K, and as a result the switching-operation decision unit 24 outputs the calculated hydraulic pressure command signal from the arithmetic circuit 23 to the brake actuator 26. That is, the OR gate 24H is provided to decide as to whether the brake actuator 26 has already been operative, or as to whether the predetermined threshold r for the calculated throttle opening-angle command signal becomes reached. In other words, the binary signal "1" output from the OR gate 24H means that the brake actuator 26 has already been operative or that the predetermined threshold r is reached and the calculated throttle opening-angle command signal value becomes less than the predetermined threshold r.

The actual switching operation of the decision unit 24 hereinafter described in detail in accordance with the timing chart of FIGS. 3(a), 3(b) and 3(c).

During a normal driving, in case that, in the operative state of the throttle actuator 25, the arithmetic circuit 23 outputs the calculated hydraulic pressure command signal value greater than the predetermined threshold s (zero) at a time point A in accordance with a further braking requirement, the decision unit 24 holds the throttle control until the calculated throttle opening-angle command signal value of the arithmetic circuit 22 reaches the predetermined threshold r at a time point B. Irrespective of the presence of the calculated hydraulic pressure command signal value (See the thin solid line of the time duration A–B of FIG. 3(b)) greater than the predetermined threshold s (zero), the throttle control is continued with a gradually decreased throttle opening-angle command signal value until the predetermined threshold r is reached. As soon as the time point B is reached and the throttle opening-angle command signal value becomes less than the predetermined threshold r, the decision unit 24 operates to switch from the throttle control to the brake control. In the system of the first embodiment made in accordance with this invention, for the time duration between the two points A and B, the throttle opening-angle command signal value is gradually attenuated to the predetermined threshold r and the final hydraulic pressure command signal value is held at zero (See the thick solid line of the time duration A–B of FIG. 3(b)), whereas hitherto the control mode is rapidly shifted from the throttle control to the brake control at the time A in response to the hydraulic pressure command signal value above zero. The gradually decreased throttle opening-angle command signal value results in a smooth deceleration of the vehicle. In contrast, during the normal driving, in case that, in the operative state of the brake actuator 26, the arithmetic circuit 22 outputs the throttle opening-angle command signal value greater than the predetermined threshold r (zero) at a time point C in accordance with a further acceleration requirement, the decision unit 24 holds the brake control until the calculated hydraulic pressure command signal value of the arithmetic circuit 23 reaches the predetermined threshold s at a time point D. Irrespective of the presence of the calculated throttle opening-angle command signal value (See the thin solid line of the time duration C–D of FIG. 3(a)) greater than zero, the brake control is continued with a gradually decreased hydraulic pressure command signal value until the predetermined threshold s is reached. As soon as the time point D is reached and the hydraulic pressure command signal value becomes less than the predetermined threshold s, the decision unit 24 operates to switch from the brake control to the throttle control. In the system of the first embodiment made in accordance with this invention, for the transition duration C–D, the hydraulic pressure command signal value is gradually attenuated to the predetermined threshold s and the final throttle opening-angle command signal value is held at zero (See the thick solid line of the time duration C–D of FIG. 3(a)), whereas hitherto the control mode is rapidly shifted from the brake control to the throttle control at the time C in response to the throttle opening-angle command signal value above zero. The gradually decreased hydraulic pressure command signal value results in a smooth acceleration of the vehicle. As set forth above, according to the system of the first embodiment, in the presence of the deceleration requirement during the throttle control, firstly the throttle is gradually closed so that the deceleration is achieved according to the throttle control as much as possible, and secondly the brake control follows the throttle control when the calculated throttle opening-angle command signal value reaches the predetermined threshold r. In contrast, in the presence of the acceleration requirement during the brake control, firstly the brakes are gradually released so that the acceleration is achieved according to the brake control as much as possible, and secondly the throttle control follows the brake control when the calculated hydraulic pressure command signal value reaches the predetermined threshold s. The above-noted switching operation between the throttle control and the brake control is similar to control procedures of a vehicle-speed control achieved by a veteran driver. As set out above, the system of the first embodiment can provide a smooth automatic speed control as seen in FIG. 3(c). As appreciated from the time durations A–B and C–D shown in FIGS. 3(a) and 3(b), in which there are two positive outputs, namely the calculated throttle opening-angle command signal generated from the arithmetic circuit 22 and greater than zero, and the calculated hydraulic pressure command signal generated from the arithmetic circuit 23, the transition between the throttle control and the brake control is properly and stably achieved via the time durations A–B and C–D. The time durations A–B and C–D will be hereinafter referred to as a "transition duration". It will be appreciated that the decision unit 24 employed in the system of the first embodiment can avoid undesirable hunting of the switching operation between the throttle control and the brake control. During a normal driving, as seen in FIGS. 3(a) and 3(b), a characteristic curve of the calculated throttle opening-angle command signal value and a characteristic curve of the calculated hydraulic pressure command signal value are comparatively moderate. On the other hand, when a quick braking operation is required, both a down-grade of the calculated throttle opening-angle command signal value and an up-grade of the calculated hydraulic pressure command signal value will be steep. As a result, in the presence of the requirement of quick braking, a transition duration becomes excessively shorter than the transition duration A–B of FIGS. 3(a) and 3(b). Similarly, in the presence of the requirement of quick acceleration, a transition duration becomes excessively shorter than the transition duration C–D of FIGS. 3(a) and 3(b). That is, the transition duration from the throttle control to the brake control is dependent on a degree of the requirement of deceleration, while the transition duration from the brake control to the throttle control is dependent on a degree of the requirement of acceleration. Concretely, when quick braking is required during the normal driving, the decision unit 24 acts to quickly switch from the throttle control to the brake control via an excessively short transition duration. Likewise, when quick acceleration is required during the normal driving, the decision unit 24 acts to quickly switch from the brake control to the throttle control via an excessively short transition duration.

Figure 4:
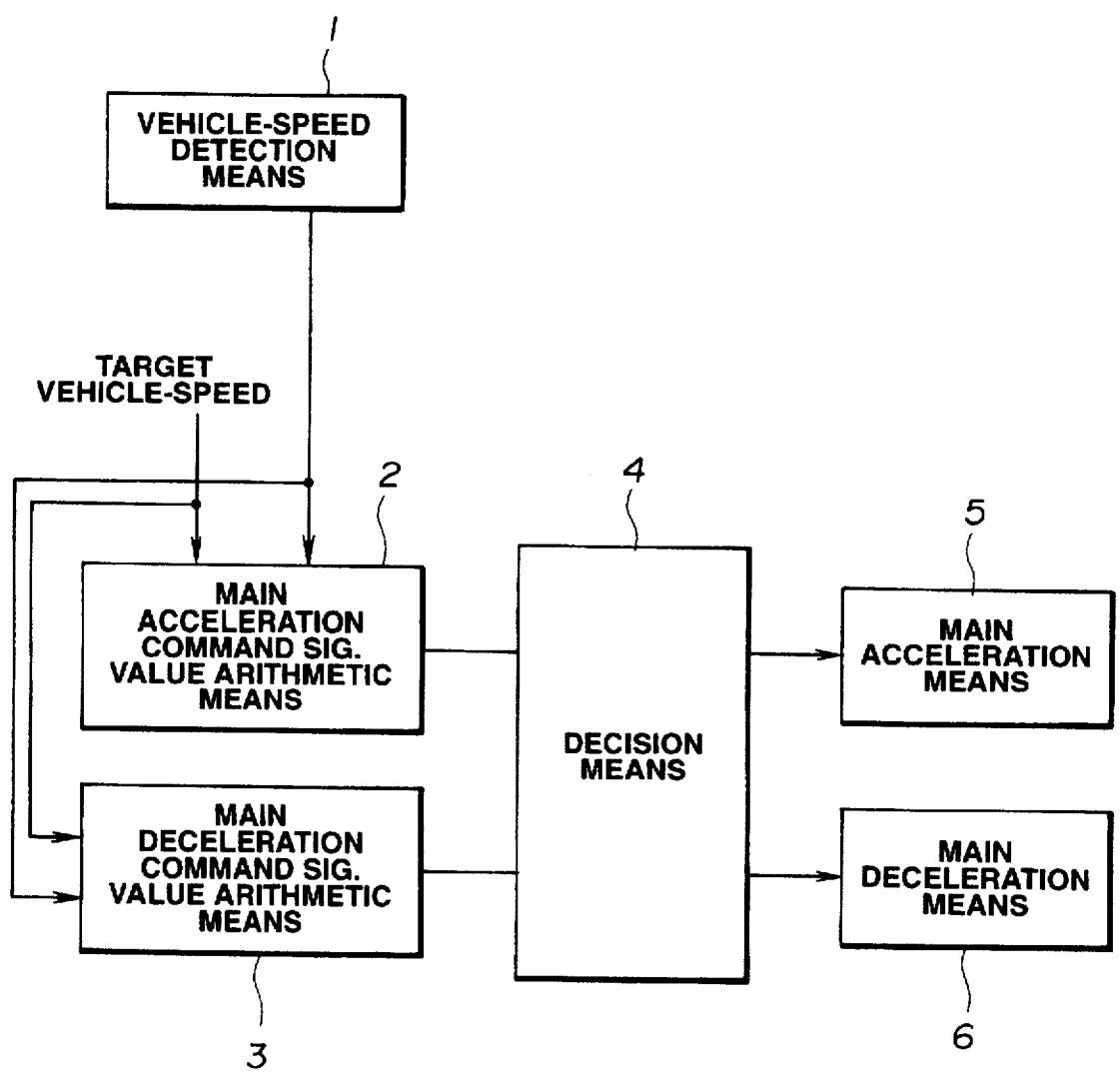
FIG. 4 is a block diagram illustrating a fundamental concept of the invention, and essentially correlated to the first embodiment.

In comparison with a plurality of means illustrated in FIG. 4, showing a fundamental concept of the automatic speed control system of the invention, the vehicle-speed detecting device 21 consisting of plural wheel-speed sensors, corresponds to a vehicle-speed detection means 1, the throttle actuator 25 corresponds to a main acceleration means 5, the brake actuator 26 corresponds to a main deceleration means 6, the throttle opening-angle arithmetic circuit 22 corresponds to a main acceleration (driving-force) command signal value arithmetic means 2, the hydraulic pressure arithmetic circuit 23 corresponds to a main deceleration (braking-force) command signal value arithmetic means 3, and the switching-operation decision unit 24 employing the throttle opening-angle selector 241, the hydraulic pressure selector 24K, the first and second threshold setting circuits 24J and 24L, and the logical circuits consisting of the comparators, the AND gates and the OR gates, corresponds to a transition-timing/switching-operation decision means 4.

Second embodiment

Figure 6:
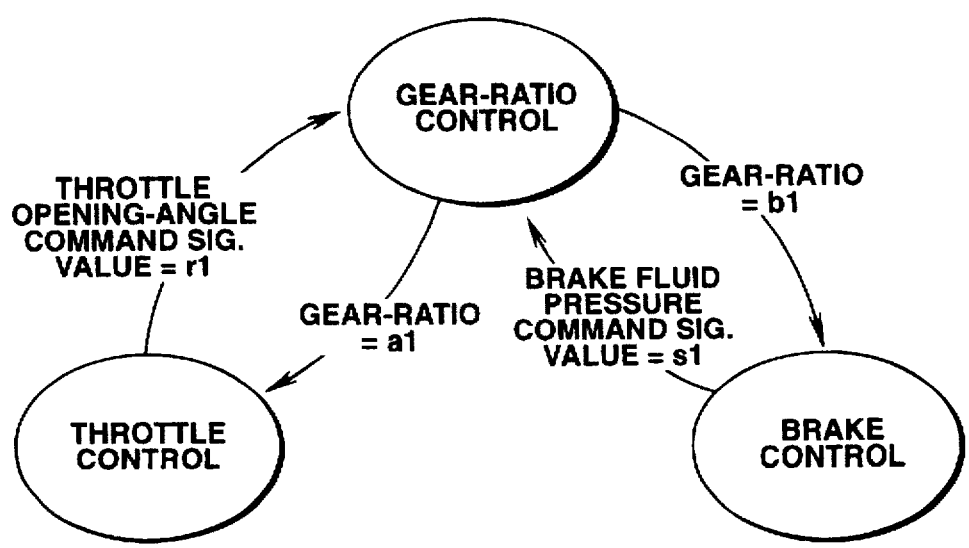
FIG. 6 is a transition diagram explaining a switching operation among a throttle control, a gear ratio control and a wheel-cylinder brake control in the system of the second embodiment.
Figure 5:
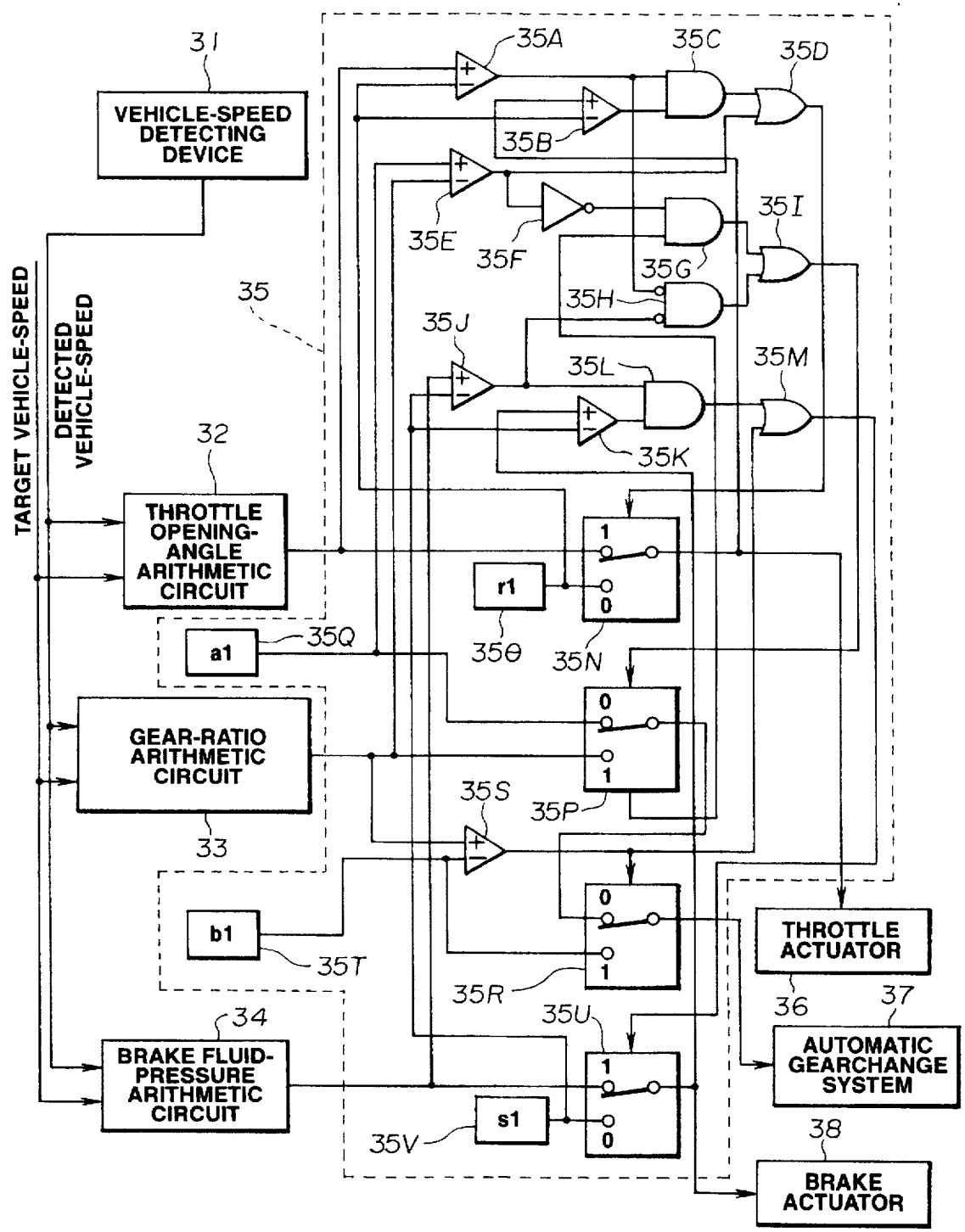
FIG. 5 is a circuit diagram illustrating a second embodiment of an automatic speed control system according to the invention.

Referring now to FIGS. 5, 6, and 7(a) to 7(d), there is shown the second embodiment of the automatic speed control system, utilizing an automatic auxiliary brake control (a gear-ratio control executed by an automatic gearchange system for the purpose of vehicle speed control), as well as the above-noted automatic throttle control and the above-noted automatic brake control. As seen in FIG. 5, the system of the second embodiment is different from that of the first embodiment in that a gear-ratio control is additionally utilized as an auxiliary brake control, in order to provide a more precise vehicle-speed control, as compared with the first embodiment. As appreciated from FIG. 5, a switching-operation decision unit 35 of the system of the second embodiment is more complicated than the decision unit 24 of the first embodiment. The input terminals of the decision unit 35 are respectively connected to a throttle opening-angle arithmetic circuit 32, a hydraulic pressure arithmetic circuit 34, and additionally to a gear-ratio arithmetic circuit 33. In the second embodiments, the respective command signal values from the arithmetic circuits 32 and 34 are derived on the basis of the deviation between the detected vehicle speed and the target vehicle speed, from the previously-described equations (2) and (3) for example. Similarly, in the gear-ratio arithmetic circuit 33, its command signal value is properly determined by independently pre-setting a group of control gains of the equations (2) or (3). The output terminals of the decision unit 35 are respectively connected to a throttle actuator 36, a hydraulic pressure actuator 38, and additionally to an automatic gearchange system 37, such as a continuously variable automatic transmission, generally abbreviated to "CVT", or an automatic transmission employing a planetary-gear system. As is generally known, the automatic gearchange system 37 can provide an auxiliary braking effect just like an engine brake, with an increased gear ratio or with down-shift. The input terminals of the throttle opening-angle arithmetic circuit 32, the gear-ratio arithmetic circuit 33 and the hydraulic pressure arithmetic circuit 34 are all connected to the vehicle-speed detecting device 31 consisting of plural wheel-speed sensors. The throttle actuator 36, the brake actuator 38 and the automatic gearchange system 37 are cooperative with each other to suitably control a driving force applied to drive wheels, such that the detected vehicle speed is adjusted to a target vehicle speed. The switching-operation decision unit 35 is provided for controlling the transition timing between the throttle control and the gear-ratio control, and between the gear-ratio control and the brake control, as detailed later. The throttle opening-angle arithmetic circuit 32 functions to calculate a command signal value of the throttle opening-angle on the basis of the detected vehicle speed and the target vehicle speed, whereas the hydraulic pressure arithmetic circuit 34 functions to calculate a command signal value of the hydraulic pressure for the wheel-cylinder operated brake on the basis of the detected vehicle speed and the target vehicle speed. Similarly, the gear-ratio arithmetic circuit 33 functions to calculate a command signal value of the gear ratio of the automatic gearchange system 37 on the basis of the detected vehicle speed and the target vehicle speed. Referring to FIG. 6, there is shown the transition diagram explaining the necessary condition for transition between a throttle control for the throttle actuator 36 and a gear-ratio control for the automatic gearchange system 37 which can adjust an auxiliary braking-force, and for the necessary condition for transition between the gear-ratio control and a brake control for the brake actuator 38. As seen in FIG. 6, even when a calculated gear-ratio command signal value produced by the gear-ratio arithmetic circuit 33 becomes above a predetermined threshold a1 during the throttle control, the throttle control is continued until a calculated throttle opening-angle command signal value produced by the throttle opening-angle arithmetic circuit 32 has reached a predetermined threshold r1. When the predetermined threshold r1 is reached, the control mode is shifted from the throttle control to the gear-ratio control (See the transition duration A–B in FIGS. 7(a) and 7(b)). During the gear-ratio control, even when a calculated hydraulic pressure command signal value produced by the hydraulic pressure arithmetic circuit 34 becomes above a predetermined threshold s1, the gear-ratio control is continued until the calculated gear-ratio command signal value produced by the gear-ratio arithmetic circuit 33 has reached a predetermined upper threshold b1. When the predetermined upper threshold b1 is reached, the control mode is shifted from the gear-ratio control to the brake control (See the transition duration C–D in FIGS. 7(b) and 7(c)). During the gear-ratio control, even when the calculated throttle opening-angle command signal value of the arithmetic circuit 32 becomes above the predetermined threshold r1, the gear-ratio control is continued until the calculated gear-ratio command signal value of the arithmetic circuit 33 has reached a predetermined lower threshold a1. When the predetermined lower threshold a1 is reached, the control mode is shifted from the gear-ratio control to the throttle control (See the transition duration G–H in FIGS. 7(a) and 7(b)). In contrast to the above, during the brake control, even when the calculated gear-ratio command signal value of the gear-ratio arithmetic circuit 33 becomes below the predetermined upper threshold b1, the brake control is continued until the calculated hydraulic pressure command signal value of the arithmetic circuit 34 has reached the predetermined threshold s1. When the predetermined threshold s1 is reached, the control mode is shifted from the brake control to the gear-ratio control (See the transition duration E–F in FIGS. 7(b) and 7(c)).

Returning to FIG. 5, in comparison between the switching-operation decision unit 24 employed in the system of the first embodiment (See FIG. 1) and the switching-operation decision unit 35 employed in the system of the second embodiment (See FIG. 5), a first pair of comparators (35A; 35B) essentially correspond to the comparator pair (24A; 24B), a second pair of comparators (35J; 35K) essentially correspond to the comparator pair (24E; 24F), a first AND gate 35C essentially corresponds to the first AND gate 24C, a second AND gate 35L essentially corresponds to the second AND gate 24G, a pair of threshold setting circuits 35Θ and 35V essentially correspond to the first and second threshold setting circuits 24J and 24L, a pair of selectors 35N and 35U essentially correspond to the throttle opening-angle selector 24I and the hydraulic pressure selector 24K, and predetermined thresholds r1 and s1 essentially correspond to the predetermined thresholds r and s. When the gearchange system 37 is in operative for the purpose of the vehicle speed control through the gear-ratio change, or the brake actuator 38 is in operative, the comparator 35A outputs a binary signal "1" or "0", whereas the comparator 35B outputs a binary signal "0". In this case, the AND gate 35C outputs a binary signal "0". In contrast, when the throttle actuator 36 is in operative, both the comparators 35A and 35B output binary signals "1", and as a result the AND gate 35C outputs a binary signal "1". As appreciated, the binary signal "1" output from the AND gate 35C means that the throttle actuator 36 has already been operative. Similarly, the binary signal "1" output from the AND circuit 35L means that the brake actuator 38 has already been operative. The decision unit 35 of the second embodiment also includes comparators 35E and 35S, an inverter 35F, AND gates 35G and 35H, OR gates 35I and 35M, a first gear-ratio selector 35P, a second gear-ratio selector 35R, a lower gear-ratio threshold setting circuit 35Q, and an upper gear-ratio threshold setting circuit 35T. The input terminals of the comparator 35E are respectively connected to the output terminal of the gear-ratio arithmetic circuit 33 and the lower gear-ratio threshold setting circuit 35Q, to compare a calculated gear-ratio command signal value derived from the arithmetic circuit 33 with the predetermined lower gear-ratio threshold a1. When the calculated gear-ratio command signal value is below the predetermined lower gear-ratio threshold a1, the comparator 35E outputs a binary signal "1". The inverter 35F inverts the output signal from the comparator 35E and the inverted signal from the inverter 35F is supplied to the input terminal of the AND gate 35G. In other words, the inverter 35F outputs a binary signal "1" when the calculated gear-ratio command signal value is above the predetermined lower gear-ratio threshold a1. The OR gate 35D of the decision unit 35 of the second embodiment is substantially similar to the OR gate of the decision unit 24 of the first embodiment. That is, the OR gate 35D is provided to decide as to whether the throttle actuator 36 has already been operative, or as to whether the calculated gear-ratio command signal value produced by the arithmetic circuit 33 becomes below the lower gear-ratio threshold a1 preset by the setting circuit 35Q. That is, the binary signal "1" output from the OR gate 35D means that the throttle actuator 36 has already been operative or that the calculated gear-ratio command signal value becomes below the lower gear-ratio threshold a1. When the signal from the OR gate 35D is "1", the selector 35N selects the calculated throttle opening-angle command signal from the arithmetic circuit 32 as a drive signal for the throttle actuator 36. When the signal from the OR gate 35D is "0", the selector 35N selects the predetermined throttle opening-angle threshold r1 preset by the setting circuit 35Θ so as to de-activate the throttle actuator 36. The AND circuit 35G receives the inverted signal from the inverter 35F and a selected-state information indicative signal from the selector 35P, so as to decide whether the gearchange system 37 has been operative i.e., during the gear-ratio control to be executed for the automatic vehicle-speed control. On the other hand, the AND gate 35H receives an inverted signal of the output signal from the comparator 35A and an inverted signal of the output signal from the comparator 35J, so as to decide as to whether the calculated throttle opening-angle command signal value is below the predetermined threshold r1 and additionally the calculated hydraulic pressure command signal value is below the predetermined threshold s1. When the above-noted condition is satisfied, i.e., when the calculated throttle opening-angle command signal value is below the predetermined threshold r1 and additionally the calculated hydraulic pressure command signal value is below the predetermined threshold s1, the AND gate 35H outputs a binary signal "1". The input terminals of the OR gate 35I are respectively connected to the output terminals of the AND gates 35G and 35H, so as to decide as to whether the gearchange system 37 has been operative for the purpose of the automatic vehicle-speed control by way of the gear-ratio change, or as to whether the calculated throttle opening-angle command signal value is below the predetermined threshold r1 and additionally the calculated hydraulic pressure command signal value is below the predetermined threshold s1. When the output signal from the AND gate 35G is "1", i.e., the gearchange system 37 has been operative, and/or when the output signal from the AND gate 35H is "1", i.e., the calculated throttle opening-angle command signal value is below the predetermined threshold r1 and additionally the calculated hydraulic pressure command signal value is below the predetermined threshold s1, the OR gate 35I outputs the binary signal "1" to the selector 35P as a pilot signal. The selector 35P is responsive to the pilot signal from the OR gate 35I, to select the calculated gear-ratio command signal produced by the arithmetic circuit 33 when the binary signal of the OR gate 35I is "1", and to select the predetermined lower gear-ratio threshold a1 preset by the setting circuit 35Q when the binary signal of the OR gate 35I is "0". The input terminals of the comparator 35S are respectively connected to the output terminal of the gear-ratio arithmetic circuit 33 and the upper gear-ratio threshold setting circuit 35T, to compare the calculated gear-ratio command signal value derived from the arithmetic circuit 33 with the predetermined upper gear-ratio threshold b1. When the calculated gear-ratio command signal value is below the predetermined upper gear-ratio threshold b1, the comparator 35S outputs a binary signal "0", so that the selector 35R selects the selected command signal value from the selector 35P as its output signal value. When the calculated gear-ratio command signal value is above the predetermined upper gear-ratio threshold b1, the comparator 35S outputs a binary signal "1", so as to select the predetermined upper gear-ratio threshold b1 as its output signal value. The output signal from the selector 35R corresponds to a final drive signal for the gearchange system 37. The OR gate 35M of the second embodiment is provided to decide as to whether the brake actuator 38 has already been operative, or as to whether the calculated gear-ratio command signal value produced by the arithmetic circuit 33 becomes above the upper gear-ratio threshold b1 preset by the setting circuit 35T. That is, the binary signal "1" output from the OR gate 35M means that the brake actuator 38 has already been operative or that the calculated gear-ratio command signal value becomes above the upper gear-ratio threshold b1. When the signal from the OR gate 35M is "1", the selector 35U selects the calculated hydraulic pressure command signal from the arithmetic circuit 34 as a drive signal for the brake actuator 38. When the signal from the OR gate 35M is "0", the selector 35U selects the predetermined hydraulic pressure threshold s1 preset by the setting circuit 35V so as to de-activate the brake actuator 38.

The actual switching operation of the decision unit 35 hereinafter described in detail in accordance with the timing chart of FIGS. 7(a), 7(b), 7(c) and 7(d).

During a normal driving, in case that, in the operative state of the throttle actuator 36, the gear-ratio arithmetic circuit 33 outputs the calculated gear-ratio command signal value greater than the predetermined threshold a1 at a time point A in accordance with a further braking requirement, the decision unit 35 holds the throttle control until the calculated throttle opening-angle command signal value of the arithmetic circuit 32 reaches the predetermined threshold r1 at a time point B. Irrespective of the presence of the calculated gear-ratio command signal value (See the thin solid line of the time duration A–B of FIG. 7(b)) greater than the predetermined threshold a1, the throttle control is continued with a gradually decreased throttle opening-angle command signal value until the predetermined threshold r1 is reached. As soon as the time point B is reached and the throttle opening-angle command signal value becomes less than the predetermined threshold r1, the decision unit 35 operates to switch from the throttle control to the gear-ratio control executed by the automatic gearchange system 37. In the system of the second embodiment made in accordance with this invention, for the transition duration A–B, the throttle opening-angle command signal value is gradually attenuated to the predetermined threshold r1 and the final gear-ratio command signal value is held at the predetermined lower threshold a1 (See the thick solid line of the time duration A–B of FIG. 7(b)). The gradually decreased throttle opening-angle command signal value results in a smooth deceleration of the vehicle. During the normal driving, in case that, in the operative state of the gearchange system 37, the arithmetic circuit 34 outputs the hydraulic pressure command signal value greater than the predetermined threshold s1 (zero) at a time point C in accordance with a further deceleration requirement, the decision unit 35 holds the gear-ratio control until the calculated gear-ratio command signal value of the arithmetic circuit 33 becomes above the predetermined upper threshold b1 at a time point D. Irrespective of the presence of the calculated hydraulic pressure command signal value (See the thin solid line of the time duration C–D of FIG. 7(c)) greater than the predetermined threshold s1 (zero), the gear-ratio control is continued until the calculated gear-ratio command signal value completely reaches the predetermined upper threshold b1 (the time point D). As soon as the time point D is reached and the calculated gear-ratio command signal value exceeds the predetermined upper threshold b1, the decision unit 35 operates to switch from the gear-ratio control to the brake control. In the system of the second embodiment made in accordance with this invention, for the transition duration C–D, the gear-ratio command signal value is gradually increased up to the predetermined upper threshold b1 and the final hydraulic pressure command signal value is held at zero (See the thick solid line of the time duration C–D of FIG. 7(c)). The gradually increased gear-ratio command signal value results in a smooth deceleration of the vehicle. During the normal driving, in case that, in the operative state of the brake actuator 38, the arithmetic circuit 33 outputs the gear-ratio command signal value less than the predetermined upper threshold b1 at a time point E in accordance with an acceleration requirement, the decision unit 35 holds the brake control until the calculated hydraulic pressure command signal value of the arithmetic circuit 34 reaches the predetermined threshold s1 (zero) at a time point F. Irrespective of the presence of the calculated gear-ratio command signal value (See the thin solid line of the time duration E–F of FIG. 7(b)) less than the predetermined threshold b1, the brake control is continued until the calculated hydraulic pressure command signal value completely reaches the predetermined threshold s1 (the time point F). As soon as the time point F is reached and the calculated hydraulic pressure command signal value reaches the predetermined threshold s1, the decision unit 35 operates to switch from the brake control to the gear-ratio control. In the system of the second embodiment made in accordance with this invention, for the transition duration E–F, the hydraulic pressure command signal value is gradually decreased down to the predetermined threshold s1 (zero) and the final gear-ratio command signal value is held at the predetermined upper threshold b1 (See the thick solid line of the time duration E–F of FIG. 7(b)). The gradually decreased hydraulic pressure command signal value results in a smooth acceleration of the vehicle. During the normal driving, in case that, in the gear-ratio control state, the arithmetic circuit 32 outputs the throttle opening-angle command signal value greater than the predetermined threshold r1 (zero) at a time point G in accordance with a further acceleration requirement, the decision unit 35 holds the gear-ratio control until the calculated gear-ratio command signal value of the arithmetic circuit 33 is decreased down to the predetermined lower threshold a1 at a time point H. Irrespective of the presence of the calculated throttle opening-angle command signal value (See the thin solid line of the time duration G–H of FIG. 7(a)) greater than zero, the gear-ratio control is continued with a gradually decreased gear-ratio command signal value until the predetermined lower threshold a1 (the time point H) is reached. As soon as the time point H is reached and the gear-ratio command signal value reaches the predetermined lower threshold a1, the decision unit 35 operates to switch from the gear-ratio control to the throttle control. In the system of the second embodiment made in accordance with this invention, for the transition duration G–H, the gear-ratio command signal value is gradually attenuated to the predetermined lower threshold a1 and the final throttle opening-angle command signal value is held at zero (See the thick solid line of the time duration G–H of FIG. 7(a)). The gradually decreased gear-ratio command signal value results in a smooth acceleration of the vehicle.

As set forth above, according to the system of the second embodiment, in the presence of the deceleration requirement during the throttle control, the deceleration can be achieved according to the throttle control as much as possible, and secondly the gear-ratio control can follow the throttle control. In the presence of the deceleration requirement or the acceleration requirement during the gear-ratio control, the deceleration demand or the acceleration demand can be achieved according to the gear-ratio control as much as possible, such that the gear-ratio is gradually increased up to the predetermined upper threshold b1 in case of the deceleration demand and such that the gear-ratio is gradually decreased down to the predetermined lower threshold a1 in case of the acceleration demand. In the presence of the acceleration requirement during the brake control, the acceleration can be achieved according to the brake control as much as possible, and secondly the gear-ratio control can follow the brake control. As can be appreciated, the decision means selectively outputs either one of the first (corresponding to the calculated throttle-opening angle), second (corresponding to the calculated hydraulic pressure) and third (corresponding to the calculated gear-ratio) command signals to continue either one of the driving-force control of the throttle actuator, the auxiliary driving-force control of the automatic gearchange system and the braking-force control of the brake actuator, executed prior to a transition, for each of the first (corresponding to the durations A–B; G–H) and second (corresponding to the durations C–D; E–F) transition durations, in order to provide a smooth transition and consequently ensure a smooth auto speed control. The above-noted switching operation among the throttle control, the gear-ratio control and the brake control is similar to control procedures of a vehicle-speed control achieved by a veteran driver. As set out above, the system of the second embodiment can provide a smooth automatic speed control as seen in FIG. 7(d). As appreciated from the time durations A–B, C–D, E–F and G–H shown in FIGS. 7(a), 7(b) and 7(c), in which there are outputs from the two different arithmetic circuits (32; 33), (33; 34) or (32; 33), the transition between the throttle control and the gear-ratio control and the transition between the gear-ratio control are properly and stably achieved via the transition durations A–B, C–D, E–F and G–H. It will be appreciated that the decision unit 35 employed in the system of the second embodiment can avoid undesirable hunting of the switching operation between the throttle control and the gear-ratio control, and between the gear-ratio control and the brake control. During a normal driving, as seen in FIGS. 7(a), 7(b) and 7(c), a characteristic curve of the calculated throttle opening-angle command signal value, a characteristic curve of the calculated gear-ratio command signal value and a characteristic curve of the calculated hydraulic pressure command signal value are comparatively moderate. On the other hand, when a quick braking operation is required, all a down-grade of the calculated throttle opening-angle command signal value, an up-grade of the calculated gear-ratio command signal value and an up-grade of the calculated hydraulic pressure command signal value will become excessively steep. As a result, in the presence of the requirement of quick braking, transition durations become excessively shorter than the transition durations A–B of FIGS. 7(a) and 7(b) and shorter than the transition durations C–D of FIGS. 7(b) and 7(c). Similarly, in the presence of the requirement of quick acceleration, transition durations become excessively shorter than the transition duration E–F of FIGS. 7(b) and 7(c) and shorter than the transition duration G–H of FIGS. 7(a) and 7(b). Additionally, the up-grade of the calculated gear-ratio command signal value will be excessively steep, and thus the transition from the throttle control through the gear-ratio control to the brake control can be very quickly achieved. Likewise, when quick acceleration is required during the normal driving, the decision unit 35 acts to quickly switch from the brake control through the gear-ratio control to the throttle control for an excessively short transition time period.

Third embodiment

Figure 8:
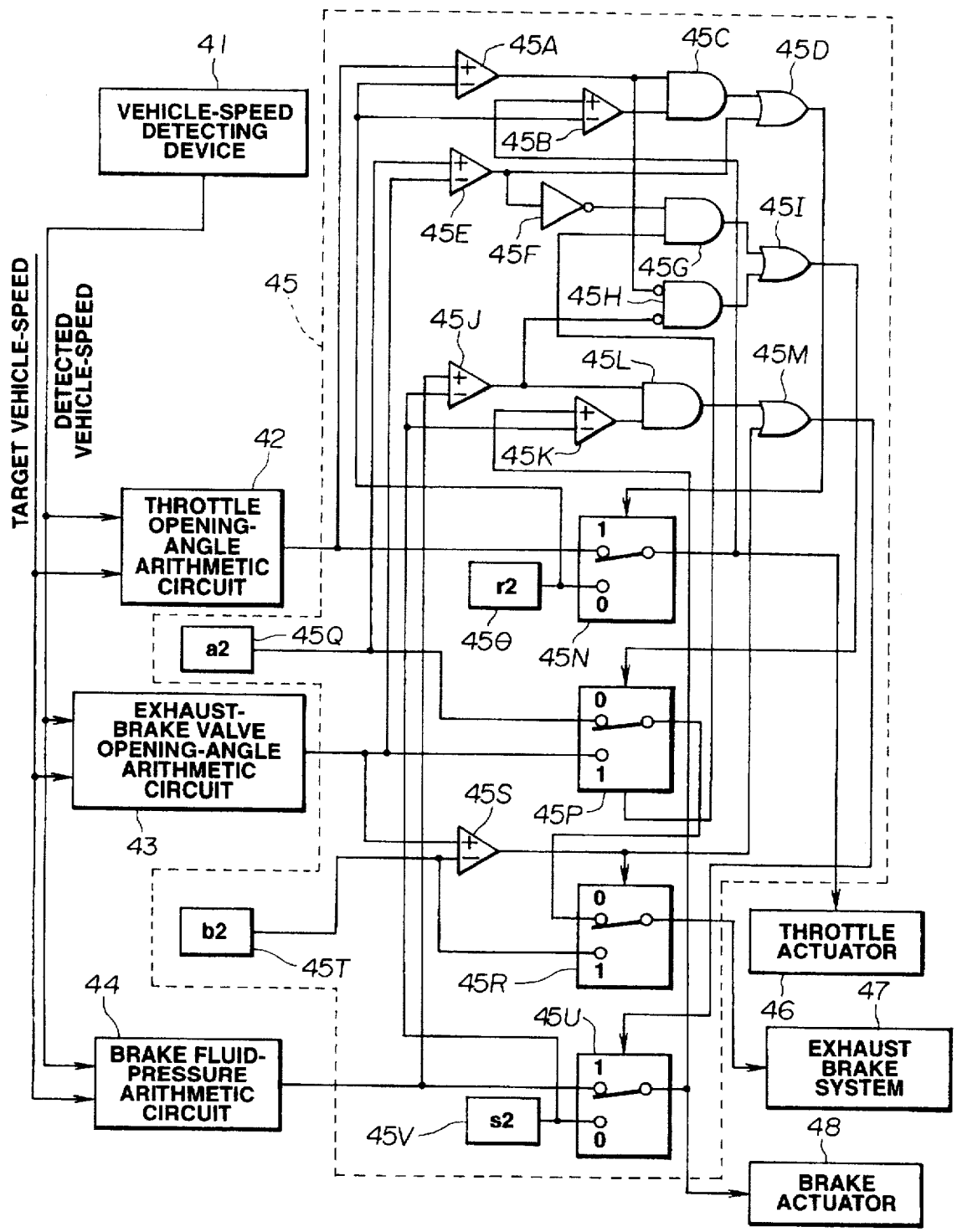
FIG. 8 is a circuit diagram illustrating a third embodiment of an automatic/speed control system according to the invention.
Figure 9:
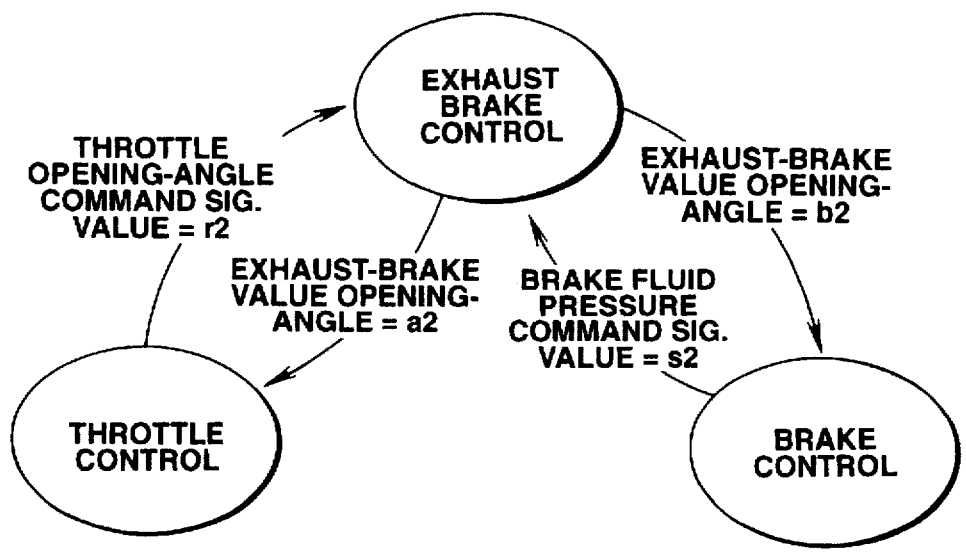
FIG. 9 is a transition diagram explaining a switching operation among a throttle control, an exhaust-brake control and a wheel-cylinder brake control in the system of the third embodiment.

Referring to FIGS. 8, 9, and 10((a) to 10(d), there is shown the third embodiment of the automatic speed control system, utilizing an automatic auxiliary brake control (an exhaust brake control by an exhaust brake system), as well as the above-noted automatic throttle control and the above-noted automatic brake control. As seen in FIG. 8, the system of the third embodiment is slightly different from that of the second embodiment in that an exhaust brake control is incorporated instead of the gear-ratio control executed by the automatic gearchange system.

As seen in FIG. 8, the decision unit 45 receives signals from a throttle opening-angle arithmetic circuit 42, a hydraulic pressure arithmetic circuit 44, and an exhaust-brake valve opening-angle arithmetic circuit 43. The decision unit 45 generates a final command signal in order to selectively activate one of a throttle actuator 46, a hydraulic pressure actuator 48 and an exhaust brake system 47. The exhaust brake system 47 acts to retard the vehicle by constricting the flow of exhaust gases coming from the engine by way of an exhaust-brake valve disposed in the exhaust system and thereby increasing an exhaust back pressure, thus providing the engine-brake effect. The input terminals of the throttle opening-angle arithmetic circuit 42, the exhaust-brake valve opening-angle arithmetic circuit 43 and the hydraulic pressure arithmetic circuit 44 are all connected to the vehicle-speed detecting device 41 consisting of plural wheel-speed sensors. The throttle actuator 46, the brake actuator 48 and the exhaust brake system 47 are cooperative with each other to suitably control a driving force applied to drive wheels, such that the detected vehicle speed is adjusted to a target vehicle speed. The switching-operation decision unit 45 is provided for controlling the transition timing between the throttle control and the exhaust-brake control, and between the exhaust-brake control and the brake control. The throttle opening-angle arithmetic circuit 42 and the hydraulic pressure arithmetic circuit 44 respectively function in the same manner as the throttle opening angle arithmetic circuit 32 and the hydraulic pressure arithmetic circuit 34 of the second embodiment. The exhaust-brake valve opening-angle arithmetic circuit 43 functions to calculate a command signal value of the valve opening-angle of the exhaust brake system 47 on the basis of the detected vehicle speed and the target vehicle speed. Referring to FIG. 9, there is shown the transition diagram explaining the necessary condition for transition between a throttle control for the throttle actuator 46 and an exhaust brake control for the exhaust brake system 47, and for the necessary condition for transition between the exhaust brake control and a brake control for the brake actuator 48. As seen in FIG. 9, even when a calculated exhaust-brake valve opening-angle command signal value produced by the exhaust-brake valve opening-angle arithmetic circuit 43 becomes above a predetermined threshold a2 during the throttle control, the throttle control is continued until a calculated throttle opening-angle command signal value produced by the throttle opening-angle arithmetic circuit 42 has reached a predetermined threshold r2. When the predetermined threshold r2 is reached, the control mode is shifted from the throttle control to the exhaust brake control (See the transition duration A–B in FIGS. 10(a) and 10(b)). During the exhaust brake control, even when a calculated hydraulic pressure command signal value produced by the hydraulic pressure arithmetic circuit 44 becomes above a predetermined threshold s2, the exhaust brake control is continued until the calculated gear-ratio command signal value produced by the arithmetic circuit 43 has reached a predetermined upper threshold b2. When the predetermined upper threshold b2 is reached, the control mode is shifted from the exhaust brake control to the brake control (See the transition duration C–D in FIGS. 10(b) and 10(c)). During the exhaust brake control, even when the calculated throttle opening-angle command signal value of the arithmetic circuit 42 becomes above the predetermined threshold r2, the exhaust brake control is continued until the calculated exhaust brake valve opening-angle command signal value of the arithmetic circuit 43 has reached a predetermined lower threshold a2. When the predetermined lower threshold a2 is reached, the control mode is shifted from the exhaust brake control to the throttle control (See the transition duration G–H in FIGS. 10(a) and 10(b)). In contrast to the above, during the brake control, even when the calculated exhaust brake valve opening-angle command signal value of the arithmetic circuit 43 becomes below the predetermined upper threshold b2, the brake control is continued until the calculated hydraulic pressure command signal value of the arithmetic circuit 44 has reached the predetermined threshold s2. When the predetermined threshold s2 is reached, the control mode is shifted from the brake control to the exhaust brake control (See the transition duration E–F in FIGS. 10(b) and 10(c)).

Returning to FIG. 8, since the basic construction of the logic circuits of the decision unit 45 of the third embodiment is similar to that of the second embodiment, the detailed description of the logic circuits of the third embodiment is omitted for the purpose of simplification of disclosure. In comparison between the decision unit 45 shown in FIG. 8 and the decision circuit 35 shown in FIG. 5, the comparators 45A, 45B, 45E, 45J, 45K and 45S, the inverter 45F, the AND gates 45C, 45G, 45H, 45L, the OR gates 45D, 45I and 45M, the selectors 45N, 45P, 45R and 45U, the setting circuits 45Θ and 45V essentially correspond to the comparators 35A, 35B, 35E, 35J, 35K and 35S, the inverter 35F, the AND gates 35C, 35G, 35H, 35L, the OR gates 35D, 35I and 35M, the selectors 35N, 35P, 35R and 35U, the setting circuits 35Θ and 35V, respectively. In the third embodiment, a lower exhaust-brake valve opening-angle threshold setting circuit 45Q is provided instead of the lower gear-ratio threshold setting circuit 35Q, while an upper exhaust-brake valve opening-angle threshold setting circuit 45T is provided instead of the upper gear-ratio threshold setting circuit 35T. Predetermined thresholds r2 and s2 essentially correspond to the predetermined thresholds r1 and s1. When the exhaust brake system 47 is in operative for the purpose of the vehicle speed control, or the brake actuator 48 is in operative, the comparator 45A outputs a binary signal "1" or "0", whereas the comparator 45B outputs a binary signal "0". In this case, the AND gate 45C outputs a binary signal "0". In contrast, when the throttle actuator 46 is in operative, both the comparators 45A and 45B output binary signals "1", and as a result the AND gate 45C outputs a binary signal "1". As appreciated, the binary signal "1" output from the AND gate 45C means that the throttle actuator 46 has already been operative. Similarly, the binary signal "1" output from the AND circuit 45L means that the brake actuator 48 has already been operative. The input terminals of the comparator 45E are respectively connected to the output terminal of the arithmetic circuit 43 and the lower exhaust-brake valve opening-angle threshold setting circuit 45Q, to compare a calculated exhaust-brake valve opening-angle command signal value derived from the arithmetic circuit 43 with the predetermined lower exhaust-brake valve opening-angle threshold a2. When the calculated exhaust-brake valve opening-angle command signal value is below the predetermined lower threshold a2, the comparator 45E outputs a binary signal "1". The inverter 45F inverts the output signal from the comparator 45E and the inverted signal from the inverter 45F is supplied to the input terminal of the AND gate 45G. In other words, the inverter 45F outputs a binary signal "1" when the calculated exhaust-brake valve opening-angle command signal value is above the predetermined lower threshold a2. The OR gate 45D is provided to decide as to whether the throttle actuator 46 has already been operative, or as to whether the calculated exhaust-brake valve opening-angle command signal value produced by the arithmetic circuit 43 becomes below the lower threshold a2 preset by the setting circuit 45Q. That is, the binary signal "1" output from the OR gate 45D means that the throttle actuator 46 has already been operative or that the calculated exhaust-brake valve opening-angle command signal value becomes below the lower threshold a2. When the signal from the OR gate 45D is "1", the selector 45N selects the calculated throttle opening-angle command signal from the arithmetic circuit 42 as a drive signal for the throttle actuator 46. When the signal from the OR gate 45D is "0", the selector 45N selects the predetermined throttle opening-angle threshold r2 preset by the setting circuit 45Θ so as to de-activate the throttle actuator 46. The AND circuit 45G receives the inverted signal from the inverter 45F and a selected-state information indicative signal from the selector 45P, so as to decide whether the exhaust brake system 47 has been operative. On the other hand, the AND gate 45H receives an inverted signal of the output signal from the comparator 45A and an inverted signal of the output signal from the comparator 45J, so as to decide as to whether the calculated throttle opening-angle command signal value is below the predetermined threshold r2 and additionally the calculated hydraulic pressure command signal value is below the predetermined threshold s2. When the above-noted condition is satisfied, i.e., when the calculated throttle opening-angle command signal value is below the predetermined threshold r2 and additionally the calculated hydraulic pressure command signal value is below the predetermined threshold s2, the AND gate 45H outputs a binary signal "1". The input terminals of the OR gate 45I are respectively connected to the output terminals of the AND gates 45G and 45H, so as to decide as to whether the exhaust brake system 47 has been operative, or as to whether the calculated throttle opening-angle command signal value is below the predetermined threshold r2 and additionally the calculated hydraulic pressure command signal value is below the predetermined threshold s2. When the output signal from the AND gate 45G is "1", i.e., the exhaust brake system 47 has been operative, and/or when the output signal from the AND gate 45H is "1", i.e., the calculated throttle opening-angle command signal value is below the predetermined threshold r2 and additionally the calculated hydraulic pressure command signal value is below the predetermined threshold s2, the OR gate 45I outputs the binary signal "1" to the selector 45P as a pilot signal. The selector 45P is responsive to the pilot signal from the OR gate 45I, to select the calculated exhaust-brake valve opening-angle command signal produced by the arithmetic circuit 43 when the binary signal of the OR gate 45I is "1", and to select the predetermined lower threshold a2 preset by the setting circuit 45Q when the binary signal of the OR gate 45I is "0". The input terminals of the comparator 45S are respectively connected to the output terminal of the arithmetic circuit 43 and the upper threshold setting circuit 45T, to compare the calculated exhaust-brake valve opening-angle command signal value derived from the arithmetic circuit 43 with the predetermined upper threshold b2. When the calculated exhaust-brake valve opening-angle command signal value is below the predetermined upper threshold b2, the comparator 45S outputs a binary signal "0", so that the selector 45R selects the selected command signal value from the selector 45P as its output signal value. When the calculated exhaust-brake valve opening-angle command signal value is above the predetermined upper threshold b2, the comparator 45S outputs a binary signal "1", so as to select the predetermined upper threshold b2 as its output signal value. The output signal from the selector 45R corresponds to a final drive signal for the exhaust brake system 47. The OR gate 45M of the third embodiment is provided to decide as to whether the brake actuator 48 has already been operative, or as to whether the calculated exhaust-brake valve opening-angle command signal value produced by the arithmetic circuit 43 becomes above the upper threshold b2 preset by the setting circuit 45T. That is, the binary signal "1" output from the OR gate 45M means that the brake actuator 48 has already been operative or that the calculated exhaust-brake valve opening-angle command signal value becomes above the upper threshold b2. When the signal from the OR gate 45M is "1", the selector 45U selects the calculated hydraulic pressure command signal from the arithmetic circuit 44 as a drive signal for the brake actuator 48. When the signal from the OR gate 45M is "0", the selector 45U selects the predetermined hydraulic pressure threshold s2 preset by the setting circuit 45V so as to de-activate the brake actuator 48.

The actual switching operation of the decision unit 45 hereinafter described in detail in accordance with the timing chart of FIGS. 10(a), 10(b), 10(c) and 10(d).

During a normal driving, in case that, in the operative state of the throttle actuator 46, the arithmetic circuit 43 outputs the calculated exhaust-brake valve opening-angle command signal value greater than the predetermined threshold a2 at a time point A in accordance with a further braking requirement, the decision unit 45 holds the throttle control until the calculated throttle opening-angle command signal value of the arithmetic circuit 42 reaches the predetermined threshold r2 at a time point B. Irrespective of the presence of the calculated exhaust-brake valve opening-angle command signal value (See the thin solid line of the time duration A–B of FIG. 10(b)) greater than the predetermined threshold a2, the throttle control is continued with a gradually decreased throttle opening-angle command signal value until the predetermined threshold r2 is reached. As soon as the time point B is reached and the throttle opening-angle command signal value becomes less than the predetermined threshold r2, the decision unit 45 operates to switch from the throttle control to the exhaust brake control. In the system of the third embodiment made in accordance with this invention, for the transition duration A–B, the throttle opening-angle command signal value is gradually attenuated to the predetermined threshold r2 and the final exhaust-brake valve opening-angle command signal value is held at the predetermined lower threshold a2 (See the thick solid line of the time duration A–B of FIG. 10(b)). The gradually decreased throttle opening-angle command signal value results in a smooth deceleration of the vehicle. During the normal driving, in case that, in the operative state of the exhaust brake system 47, the arithmetic circuit 44 outputs the hydraulic pressure command signal value greater than the predetermined threshold s2 (zero) at a time point C in accordance with a further deceleration requirement, the decision unit 45 holds the exhaust brake control until the calculated exhaust-brake valve opening-angle command signal value of the arithmetic circuit 43 becomes above the predetermined upper threshold b2 at a time point D. Irrespective of the presence of the calculated hydraulic pressure command signal value (See the thin solid line of the time duration C–D of FIG. 10(c)) greater than the predetermined threshold s2 (zero), the exhaust brake control is continued until the calculated exhaust-brake valve opening-angle command signal value completely reaches the predetermined upper threshold b2 (the time point D). As soon as the time point D is reached and the calculated exhaust-brake valve opening-angle command signal value exceeds the predetermined upper threshold b2, the decision unit 45 operates to switch from the exhaust brake control to the brake control. In the system of the third embodiment made in accordance with this invention, for the transition duration C–D, the exhaust-brake valve opening-angle command signal value is gradually increased up to the predetermined upper threshold b2 and the final hydraulic pressure command signal value is held at zero (See the thick solid line of the time duration C–D of FIG. 10(c)). The gradually increased exhaust-brake valve opening-angle command signal value results in a smooth deceleration of the vehicle. During the normal driving, in case that, in the operative state of the brake actuator 48, the arithmetic circuit 43 outputs the exhaust-brake valve opening-angle command signal value less than the predetermined upper threshold b2 at a time point E in accordance with an acceleration requirement, the decision unit 45 holds the brake control until the calculated hydraulic pressure command signal value of the arithmetic circuit 44 reaches the predetermined threshold s2 (zero) at a time point F. Irrespective of the presence of the calculated exhaust-brake valve opening-angle command signal value (See the thin solid line of the time duration E–F of FIG. 10(b)) less than the predetermined threshold b2, the brake control is continued until the calculated hydraulic pressure command signal value completely reaches the predetermined threshold s2 (the time point F). As soon as the time point F is reached and the calculated hydraulic pressure command signal value reaches the predetermined threshold s2, the decision unit 45 operates to switch from the brake control to the exhaust brake control. In the system of the third embodiment made in accordance with this invention, for the transition duration E–F, the hydraulic pressure command signal value is gradually decreased down to the predetermined threshold s2 (zero) and the final exhaust-brake valve opening-angle command signal value is held at the predetermined upper threshold b2 (See the thick solid line of the time duration E–F of FIG. 10(b)). The gradually decreased hydraulic pressure command signal value results in a smooth acceleration of the vehicle. During the normal driving, in case that, in the exhaust-brake control state, the arithmetic circuit 42 outputs the throttle opening-angle command signal value greater than the predetermined threshold r2 (zero) at a time point G in accordance with a further acceleration requirement, the decision unit 45 holds the exhaust brake control until the calculated exhaust-brake valve opening-angle command signal value of the arithmetic circuit 43 is decreased down to the predetermined lower threshold a2 at a time point H. Irrespective of the presence of the calculated throttle opening-angle command signal value (See the thin solid line of the time duration G–H of FIG. 10(a)) greater than zero, the exhaust brake control is continued with a gradually decreased exhaust-brake valve opening-angle command signal value until the predetermined lower threshold a2 (the time point H) is reached. As soon as the time point H is reached and the exhaust-brake valve opening-angle command signal value reaches the predetermined lower threshold a2, the decision unit 45 operates to switch from the exhaust brake control to the throttle control. In the system of the third embodiment made in accordance with this invention, for the transition duration G–H, the exhaust-brake valve opening-angle command signal value is gradually attenuated to the predetermined lower threshold a2 and the final throttle opening-angle command signal value is held at zero (See the thick solid line of the time duration G–H of FIG. 10(a)). The gradually decreased exhaust-brake valve opening-angle command signal value results in a smooth acceleration of the vehicle.

Fourth embodiment

Figure 11:
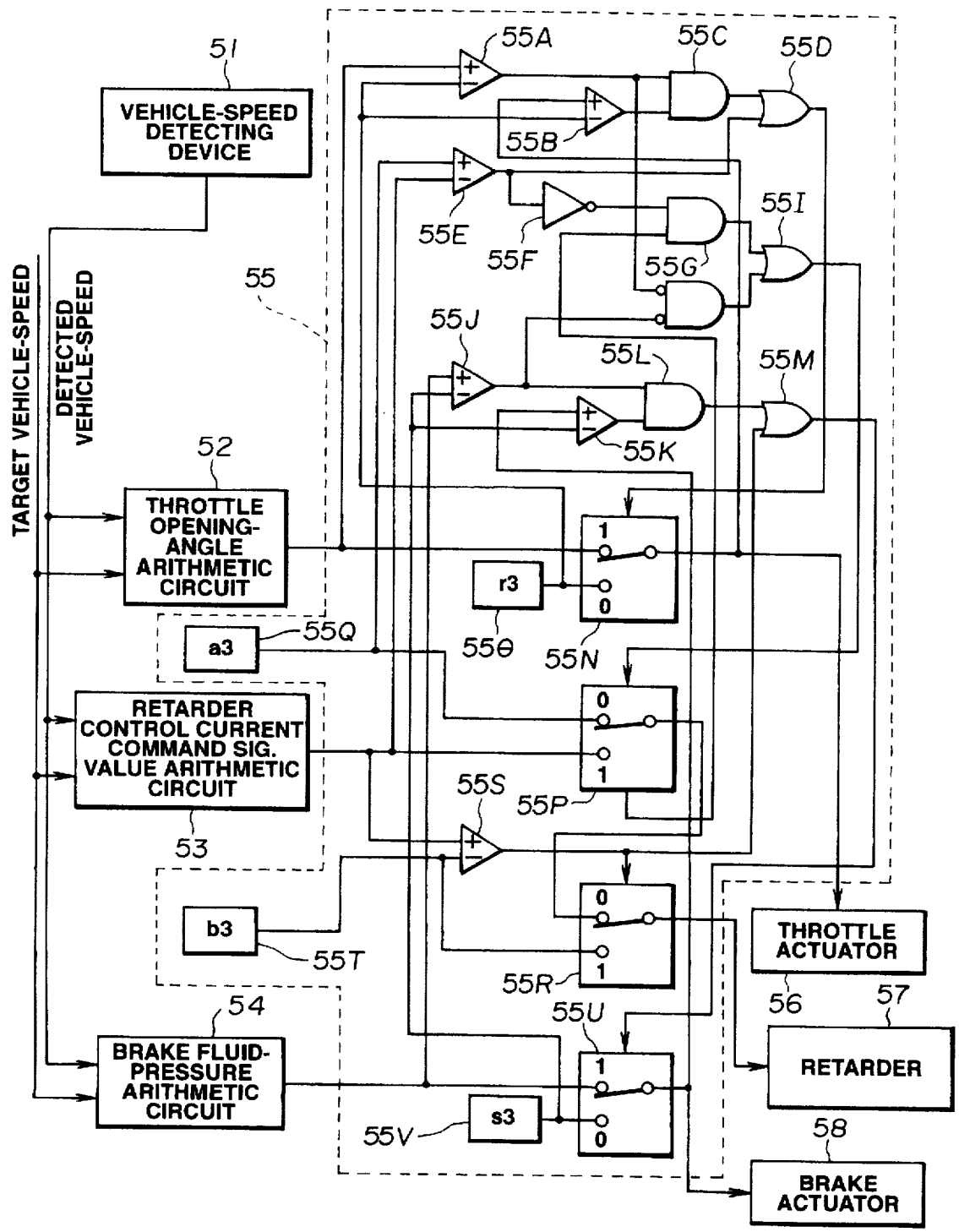
FIG. 11 is a circuit diagram illustrating a fourth embodiment of an automatic speed control system according to the invention.

Referring to FIGS. 11, 12, and 13(a) to 13(d), there is shown the fourth embodiment of the automatic speed control system, utilizing an electric retarder serving as an automatic auxiliary brake. As seen in FIG. 11, the system of the fourth embodiment is slightly different from that of the second embodiment in that an electric retarder 57 is incorporated instead of the automatic gearchange system 37.

Figure 12:
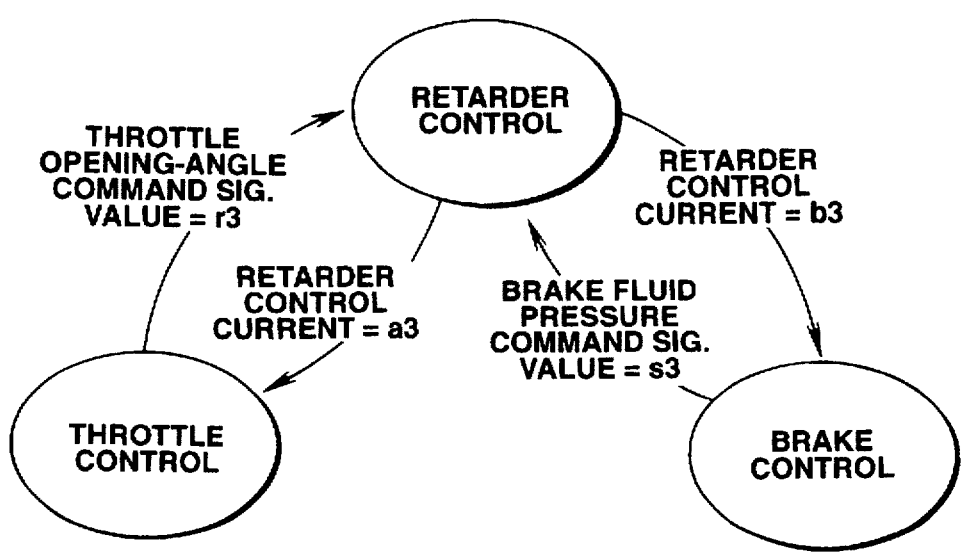
FIG. 12 is a transition diagram explaining a switching operation among a throttle control, a retarder control and a brake control in the system of the fourth embodiment.

As seen in FIG. 11, the decision unit 55 receives signals from a throttle opening-angle arithmetic circuit 52, a hydraulic pressure arithmetic circuit 55, and a retarder control current arithmetic circuit 53. The decision unit 55 generates a final command signal in order to selectively activate one of a throttle actuator 56, a hydraulic pressure actuator 58 and an electric retarder 57. The electric retarder 57 is traditionally attached to the propeller shaft or to the power train of the transmission, for converting kinetic energy of motion (a part of the driving torque) to electric energy. This conversion produces the retarding effect (an auxiliary braking action). In this case, the electric retarder 57 serves as a generator. The input terminals of the throttle opening-angle arithmetic circuit 52, the retarder control current arithmetic circuit 53 and the hydraulic pressure arithmetic circuit 55 are all connected to the vehicle-speed detecting device 51 consisting of plural wheel-speed sensors. The throttle actuator 56, the brake actuator 58 and the retarder 57 are cooperative with each other to suitably control a driving force applied to drive wheels, such that the detected vehicle speed is adjusted to a target vehicle speed. The switching-operation decision unit 55 is provided for controlling the transition timing between the throttle control and the retarder control, and between the retarder control and the brake control. The throttle opening-angle arithmetic circuit 52 and the hydraulic pressure arithmetic circuit 55 respectively function in the same manner as the throttle opening angle arithmetic circuit 32 and the hydraulic pressure arithmetic circuit 35 of the second embodiment. The retarder control current arithmetic circuit 53 functions to calculate a command signal value of the control current applied to the retarder 57 on the basis of the detected vehicle speed and the target vehicle speed. Referring to FIG. 12, there is shown the transition diagram explaining the necessary condition for transition between a throttle control for the throttle actuator 56 and a retarder control for the electric retarder 57, and for the necessary condition for transition between the retarder control and a brake control for the brake actuator 58. As seen in FIG. 12, even when a calculated retarder control current command signal value produced by the retarder control current arithmetic circuit 53 becomes above a predetermined threshold a3 during the throttle control, the throttle control is continued until a calculated throttle opening-angle command signal value produced by the throttle opening-angle arithmetic circuit 52 has reached a predetermined threshold r3. When the predetermined threshold r3 is reached, the control mode is shifted from the throttle control to the retarder control (See the transition duration A–B in FIGS. 13(a) and 13(b)). During the retarder control, even when a calculated hydraulic pressure command signal value produced by the hydraulic pressure arithmetic circuit 55 becomes above a predetermined threshold s3, the retarder control is continued until the calculated retarder control current command signal value produced by the arithmetic circuit 53 has reached a predetermined upper threshold b3. When the predetermined upper threshold b3 is reached, the control mode is shifted from the retarder control to the brake control (See the transition duration C–D in FIGS. 13(b) and 13(c))). During the retarder control, even when the calculated throttle opening-angle command signal value of the arithmetic circuit 52 becomes above the predetermined threshold r3, the retarder control is continued until the calculated retarder control current command signal value of the arithmetic circuit 53 has reached a predetermined lower threshold a3. When the predetermined lower threshold a3 is reached, the control mode is shifted from the retarder control to the throttle control (See the transition duration G–H in FIGS. 13(a) and 13(b)). In contrast to the above, during the brake control, even when the calculated retarder control current command signal value of the arithmetic circuit 53 becomes below the predetermined upper threshold b3, the brake control is continued until the Calculated hydraulic pressure command signal value of the arithmetic circuit 55 has reached the predetermined threshold s3. When the predetermined threshold s3 is reached, the control mode is shifted from the brake control to the retarder control (See the transition duration E–F in FIGS. 13(b) and 13(c)).

Returning to FIG. 11, since the basic construction of the logic circuits of the decision unit 55 of the fourth embodiment is similar to that of the second embodiment, the detailed description of the logic circuits of the fourth embodiment is omitted for the purpose of simplification of disclosure. In comparison between the decision unit 55 shown in FIG. 11 and the decision circuit 35 shown in FIG. 5, the comparators 55A, 55B, 55E, 55J, 55K and 55S, the inverter 55F, the AND gates 55C, 55G, 55H, 55L, the OR gates 55D, 55I and 55M, the selectors 55N, 55P, 55R and 55U, the setting circuits 55Θ and 55V essentially correspond to the comparators 35A, 35B, 35E, 35J, 35K and 35S, the inverter 35F, the AND gates 35C, 35G, 35H, 35L, the OR gates 35D, 35I and 35M, the selectors 35N, 35P, 35R and 35U, the setting circuits 35Θ and 35V, respectively. In the fourth embodiment, a lower retarder control current threshold setting circuit 55Q is provided instead of the lower gear-ratio threshold setting circuit 35Q, while an upper retarder control current threshold setting circuit 55T is provided instead of the upper gear-ratio threshold setting circuit 35T. Predetermined thresholds r3 and s3 essentially correspond to the predetermined thresholds r1 and s1. When the retarder 57 is in operative for the purpose of the vehicle speed control, or the brake actuator 58 is in operative, the comparator 55A outputs a binary signal "1" or "0", whereas the comparator 55B outputs a binary signal "0". In this case, the AND gate 55C outputs a binary signal "0". In contrast, when the throttle actuator 56 is in operative, both the comparators 55A and 55B output binary signals "1", and as a result the AND gate 55C outputs a binary signal "1". As appreciated, the binary signal "1" output from the AND gate 55C means that the throttle actuator 56 has already been operative. Similarly, the binary signal "1" output from the AND circuit 55L means that the brake actuator 58 has already been operative. The input terminals of the comparator 55E are respectively connected to the output terminal of the arithmetic circuit 53 and the lower retarder control current threshold setting circuit 55Q, to compare a calculated retarder control current command signal value derived from the arithmetic circuit 53 with the predetermined lower retarder control current threshold a3. When the calculated retarder control current command signal value is below the predetermined lower threshold a3, the comparator 55E outputs a binary signal "1" The inverter 55F inverts the output signal from the comparator 55E and the inverted signal from the inverter 55F is supplied to the input terminal of the AND gate 55G. In other words, the inverter 55F outputs a binary signal "1" when the calculated retarder control current command signal value is above the predetermined lower threshold a3. The OR gate 55D is provided to decide as to whether the throttle actuator 56 has already been operative, or as to whether the calculated retarder control current command signal value produced by the arithmetic circuit 53 becomes below the lower threshold a3 preset by the setting circuit 55Q. That is, the binary signal "1" output from the OR gate 55D means that the throttle actuator 56 has already been operative or that the calculated retarder control current command signal value becomes below the lower threshold a3. When the signal from the OR gate 55D is "1", the selector 55N selects the calculated throttle opening-angle command signal from the arithmetic circuit 52 as a drive signal for the throttle actuator 56. When the signal from the OR gate 55D is "0", the selector 55N selects the predetermined throttle opening-angle threshold r3 preset by the setting circuit 55Θ so as to de-activate the throttle actuator 56. The AND circuit 55G receives the inverted signal from the inverter 55F and a selected-state information indicative signal from the selector 55P, so as to decide whether the retarder 57 has been operative. On the other hand, the AND gate 55H receives an inverted signal of the output signal from the comparator 55A and an inverted signal of the output signal from the comparator 55J, so as to decide as to whether the calculated throttle opening-angle command signal value is below the predetermined threshold r3 and additionally the calculated hydraulic pressure command signal value is below the predetermined threshold s3. When the above-noted condition is satisfied, i.e., when the calculated throttle opening-angle command signal value is below the predetermined threshold r3 and additionally the calculated hydraulic pressure command signal value is below the predetermined threshold s3, the AND gate 55H outputs a binary signal "1". The input terminals of the OR gate 55I are respectively connected to the output terminals of the AND gates 55G and 55H, so as to decide as to whether the retarder 57 has been operative, or as to whether the calculated throttle opening-angle command signal value is below the predetermined threshold r3 and additionally the calculated hydraulic pressure command signal value is below the predetermined threshold s3. When the output signal from the AND gate 55G is "1", i.e., the retarder 57 has been operative and/or when the output signal from the AND gate 55H is "1", i.e., the calculated throttle opening-angle command signal value is below the predetermined threshold r3 and additionally the calculated hydraulic pressure command signal value is below the predetermined threshold s3, the OR gate 55I outputs the binary signal "1" to the selector 55P as a pilot signal. The selector 55P is responsive to the pilot signal from the OR gate 55I, to select the calculated retarder control current command signal produced by the arithmetic circuit 53 when the binary signal of the OR gate 55I is "1", and to select the predetermined lower threshold a3 preset by the setting circuit 55Q when the binary signal of the OR gate 55I is "0". The input terminals of the comparator 55S are respectively connected to the output terminal of the arithmetic circuit 53 and the upper threshold setting circuit 55T, to compare the calculated retarder control current command signal value derived from the arithmetic circuit 53 with the predetermined upper threshold b3. When the calculated retarder control current command signal value is below the predetermined upper threshold b3, the comparator 55S outputs a binary signal "0", so that the selector 55R selects the selected command signal value from the selector 55P as its output signal value. When the calculated retarder control current command signal value is above the predetermined upper threshold b3, the comparator 55S outputs a binary signal "1", so as to select the predetermined upper threshold b3 as its output signal value. The output signal from the selector 55R corresponds to a final drive signal for the retarder 57. The OR gate 55M of the fourth embodiment is provided to decide as to whether the brake actuator 58 has already been operative, or as to whether the calculated retarder control current command signal value produced by the arithmetic circuit 53 becomes above the upper threshold b3 preset by the setting circuit 55T. That is, the binary signal "1" output from the OR gate 55M means that the brake actuator 58 has already been operative or that the calculated retarder control current command signal value becomes above the upper threshold b3. When the signal from the OR gate 55M is "1", the selector 55U selects the calculated hydraulic pressure command signal from the arithmetic circuit 55 as a drive signal for the brake actuator 58. When the signal from the OR gate 55M is "0", the selector 55U selects the predetermined hydraulic pressure threshold s3 preset by the setting circuit 55V so as to de-activate the brake actuator 58.

The actual switching operation of the decision unit 55 hereinafter described in detail in accordance with the timing chart of FIGS. 13(a), 13(b), 13(c) and 13(d).

During a normal driving, in case that, in the operative state of the throttle actuator 56, the arithmetic circuit 53 outputs the calculated retarder control current command signal value greater than the predetermined threshold a3 at a time point A in accordance with a further braking requirement, the decision unit 55 holds the throttle control until the calculated throttle opening-angle command signal value of the arithmetic circuit 52 reaches the predetermined threshold r3 at a time point B. Irrespective of the presence of the calculated retarder control current command signal value (See the thin solid line of the time duration A–B of FIG. 13(b)) greater than the predetermined threshold a3, the throttle control is continued with a gradually decreased throttle opening-angle command signal value until the predetermined threshold r3 is reached. As soon as the time point B is reached and the throttle opening-angle command signal value becomes less than the predetermined threshold r3, the decision unit 55 operates to switch from the throttle control to the retarder control. In the system of the fourth embodiment made in accordance with this invention, for the transition duration A–B, the throttle opening-angle command signal value is gradually attenuated to the predetermined threshold r3 and the final retarder control current command signal value is held at the predetermined lower threshold a3 (See the thick solid line of the time duration A–B of FIG. 13(b)). The gradually decreased throttle opening-angle command signal value results in a smooth deceleration of the vehicle. During the normal driving, in case that, in the operative state of the retarder 57, the arithmetic circuit 55 outputs the hydraulic pressure command signal value greater than the predetermined threshold s3 (zero) at a time point C in accordance with a further deceleration requirement, the decision unit 55 holds the retarder control until the calculated retarder control current command signal value of the arithmetic circuit 53 becomes above the predetermined upper threshold b3 at a time point D. Irrespective of the presence of the calculated hydraulic pressure command signal value (See the thin solid line of the time duration C–D of FIG. 13(c)) greater than the predetermined threshold s3 (zero), the exhaust brake control is continued until the calculated retarder control current command signal value completely reaches the predetermined upper threshold b3 (the time point D). As soon as the time point D is reached and the calculated retarder control current command signal value exceeds the predetermined upper threshold b3, the decision unit 55 operates to switch from the retarder control to the brake control. In the system of the fourth embodiment made in accordance with this invention, for the transition duration C–D, the retarder control current command signal value is gradually increased up to the predetermined upper threshold b3 and the final hydraulic pressure command signal value is held at zero (See the thick solid line of the time duration C–D of FIG. 13(c)). The gradually increased retarder control current command signal value results in a smooth deceleration of the vehicle. During the normal driving, in case that, in the operative state of the brake actuator 58, the arithmetic circuit 53 outputs the retarder control current command signal value less than the predetermined upper threshold b3 at a time point E in accordance with an acceleration requirement, the decision unit 55 holds the brake control until the calculated hydraulic pressure command signal value of the arithmetic circuit 55 reaches the predetermined threshold s3 (zero) at a time point F. Irrespective of the presence of the calculated retarder control current command signal value (See the thin solid line of the time duration E–F of FIG. 13(b)) less than the predetermined threshold b3, the brake control is continued until the calculated hydraulic pressure command signal value completely reaches the predetermined threshold s3 (the time point F). As soon as the time point F is reached and the calculated hydraulic pressure command signal value reaches the predetermined threshold s3, the decision unit 55 operates to switch from the brake control to the retarder control. In the system of the fourth embodiment made in accordance with this invention, for the transition duration E–F, the hydraulic pressure command signal value is gradually decreased down to the predetermined threshold s3 (zero) and the final retarder control current command signal value is held at the predetermined upper threshold b3 (See the thick solid line of the time duration E–F of FIG. 13(b)). The gradually decreased hydraulic pressure command signal value results in a smooth acceleration of the vehicle. During the normal driving, in case that, in the retarder control state, the arithmetic circuit 52 outputs the throttle opening-angle command signal value greater than the predetermined threshold r3 (zero) at a time point G in accordance with a further acceleration requirement, the decision unit 55 holds the retarder control until the calculated retarder control current command signal value of the arithmetic circuit 53 is decreased down to the predetermined lower time period a3 at a time point H. Irrespective of the presence of the calculated throttle opening-angle command signal value (See the thin solid line of the time duration G–H of FIG. 13(a)) greater than zero, the retarder control is continued with a gradually decreased retarder control current command signal value until the predetermined lower threshold a3 (the time point H) is reached. As soon as the time point H is reached and the retarder control current command signal value reaches the predetermined lower threshold a3, the decision unit 55 operates to switch from the retarder control to the throttle control. In the system of the fourth embodiment made in accordance with this invention, for the transition duration G–H, the retarder control current command signal value is gradually attenuated to the predetermined lower threshold a3 and the final throttle opening-angle command signal value is held at zero (See the thick solid line of the time duration G–H of FIG. 13(a)). The gradually decreased retarder control current command signal value results in a smooth acceleration of the vehicle.

As will be appreciated from the above, the automatic vehicle-speed control systems of the third and fourth embodiments can provide the same automatic speed controlling effects as the system of the second embodiment.

Figure 14:
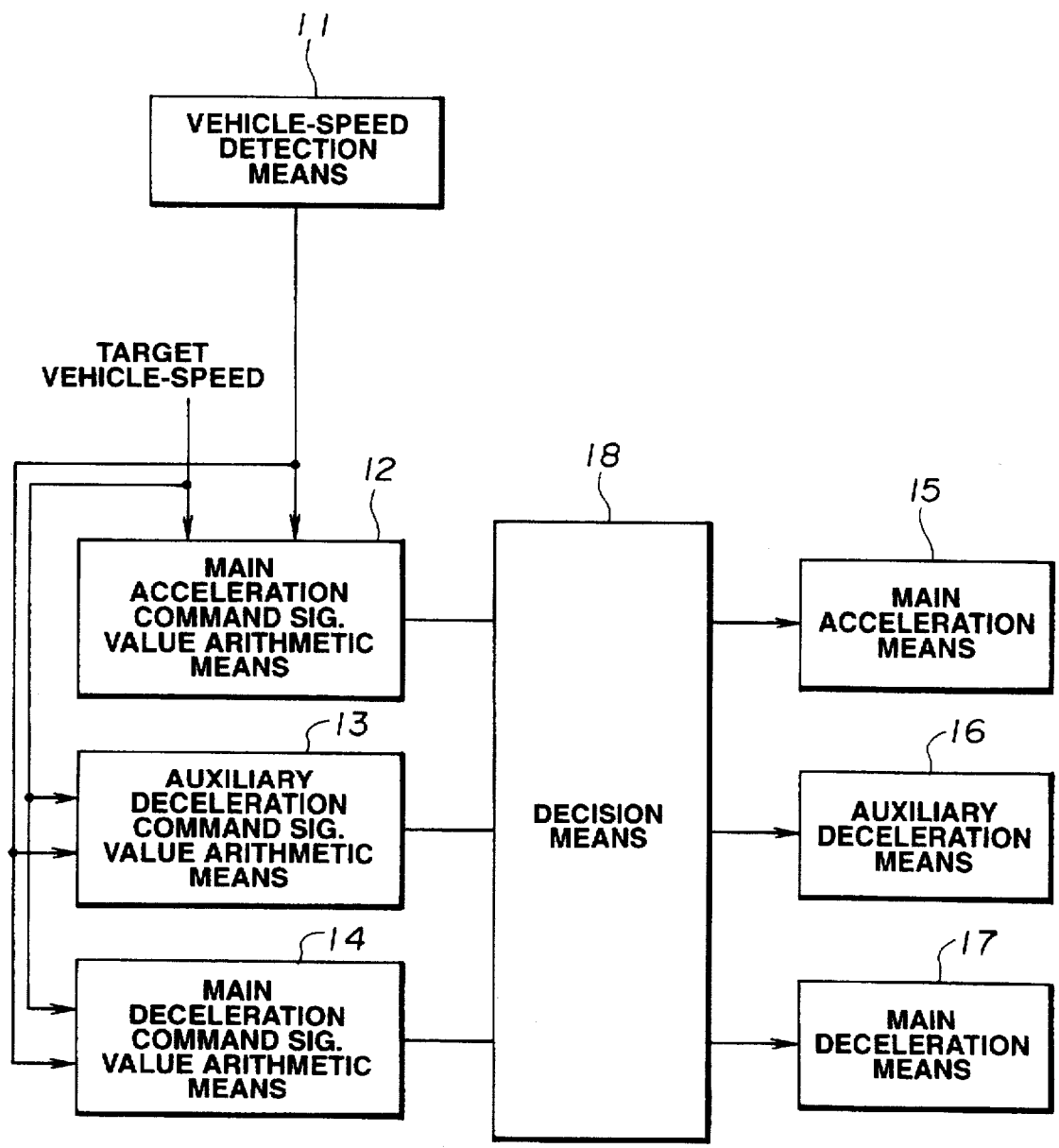
FIG. 14 is another block diagram illustrating a fundamental concept of the invention, and essentially correlated to the second to fourth embodiments.
Figure 15:
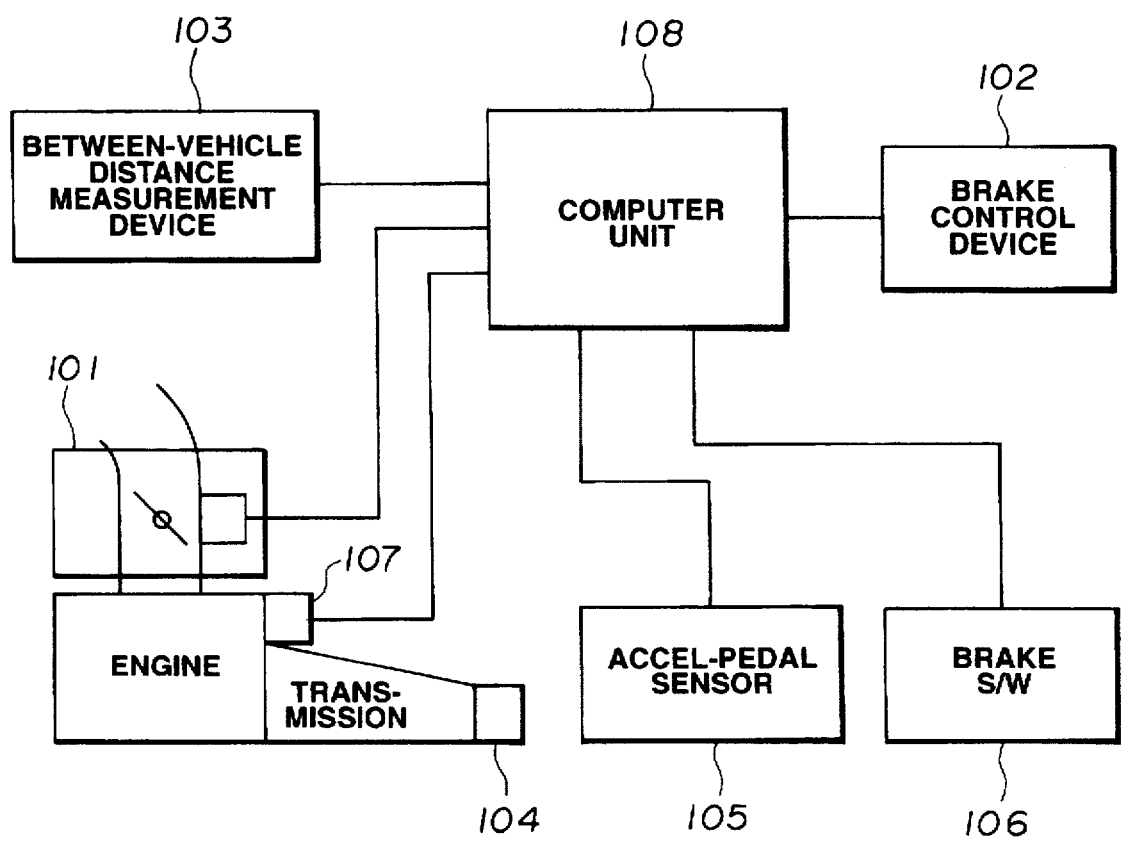
FIG. 15 is a block diagram illustrating a prior art automatic speed control system, entitled "Traveling Controller".

In comparison with a plurality of means shown in FIG. 14, showing a fundamental concept of the automatic speed control system of the invention, each of the vehicle-speed detecting devices 31, 41 and 51 corresponds to a vehicle-speed detection means 11, each of the throttle actuators 36, 46 and 56 corresponds to a main acceleration means 15, each of the brake actuators 38, 48 and 58 corresponds to a main deceleration means 17, each of the throttle opening-angle arithmetic circuits 32, 42 and 52 corresponds to a main acceleration (driving-force) command signal value arithmetic means 12, each of the hydraulic pressure arithmetic circuits 34, 44 and 54 corresponds to a main deceleration (braking-force) command signal value arithmetic means 14, and each of the switching-operation decision units 35, 45 and 55 corresponds to a transition-timing/switching operation decision means 18. Additionally, each of the gear-ratio arithmetic circuit 33, the exhaust-brake valve opening-angle arithmetic circuit 43 and the retarder control current arithmetic circuit 53 corresponds to an auxiliary deceleration (braking-force) command signal value arithmetic means 13, and each of the automatic gearchange system 37, the exhaust brake system 47 and the retarder 57 corresponds to an auxiliary deceleration means 16.

In the system of the fourth embodiment, although the electric retarder 57 is utilized as an auxiliary brake control device, any type of retarder which can supplement a vehicle's wheel-cylinder operated brake or provide an auxiliary braking effect instead of the wheel-cylinder operated brake (the main brake) may be used. For example, the electric retarder 57 may be replaced with a hydraulic retarder, utilizing the resistance to agitation of working oil.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An automatic speed control system for an automotive vehicle, comprising:

detection means for detecting a vehicle speed of the vehicle;

acceleration means for providing an increased acceleration exerted on the vehicle by automatically adjusting a driving force applied to road wheels;

deceleration means for providing an increased deceleration exerted on the vehicle by automatically adjusting a braking force applied to the road wheels;

first arithmetic means for calculating a value of a first command signal to be sent to said acceleration means, based on a target vehicle speed and the vehicle speed detected by said detection means;

second arithmetic means for calculating a value of a second command signal to be sent to said deceleration means, based on said target vehicle speed and the vehicle speed detected by said detection means; and decision means for switching from one of a driving-force control of said acceleration means and a braking-force control of said deceleration means to another, so that, during said driving-force control, said driving-force control is continued until the value of said first command signal reaches a first predetermined threshold and said driving-force control is switched to said braking-force control when said first predetermined threshold is reached, and so that, during said braking-force control, said braking-force control is continued until the value of said second command signal reaches a second predetermined threshold and said braking-force control is switched to said driving-force control when said second predetermined threshold is reached, during a simultaneous occurrence of said first command signal having a value greater than said first predetermined threshold and said second command signal having a value greater than said second predetermined threshold.

2. An automatic speed control system for an automotive vehicle, comprising:

detection means for detecting a vehicle speed of the vehicle;

acceleration means for providing an increased acceleration exerted on the vehicle by automatically adjusting a driving force applied to road wheels;

deceleration means for providing an increased deceleration exerted on the vehicle by automatically adjusting a braking force applied to the road wheels;

first arithmetic means for calculating a value of a first command signal to be sent to said acceleration means, based on a target vehicle speed and the vehicle speed detected by said detection means;

second arithmetic means for calculating a value of a second command signal to be sent to said deceleration means, based on said target vehicle speed and the vehicle speed detected by said detection means; and decision means for switching from one of a driving-force control of said acceleration means and a braking-force control of said deceleration means to another, wherein a first group of control gains used in said first arithmetic means and a second group of control gains used in said second arithmetic means are preset to provide transition durations in which said first command signal having a value greater than a first predetermined threshold and said second command signal having a value greater than a second predetermined threshold occur concurrently, wherein said decision means selectively outputs one of said first and second command signals to continue the corresponding one of said driving-force control and said braking-force control, executed prior to a transition, for each of said transition durations.

3. An automatic speed control system for an automotive vehicle, comprising:

detection means for detecting a vehicle speed of the vehicle;

acceleration means for providing an increased acceleration exerted on the vehicle by automatically adjusting a driving force applied to road wheels;

deceleration means for providing an increased deceleration exerted on the vehicle by automatically adjusting a braking force applied to the road wheels;

first arithmetic means for calculating a value of a first command signal to be sent to said acceleration means, based on a target vehicle speed and the vehicle speed detected by said detection means;

second arithmetic means for calculating a value of a second command signal to be sent to said deceleration means, based on said target vehicle speed and the vehicle speed detected by said detection means; and decision means for switching from one of a driving-force control of said acceleration means and a braking-force control of said deceleration means to another, wherein a first group of control gains used in said first arithmetic means and a second group of control gains used in said second arithmetic means are preset to provide transition durations in which said first command signal having a value greater than a first predetermined threshold and said second command signal having a value greater than a second predetermined threshold occur concurrently, wherein said driving-force control is continued for said transition duration in which the value of said first command signal is decreasingly controlled toward said first predetermined threshold and then said driving-force control is switched to said braking-force control when said first predetermined threshold is reached, and said braking-force control is continued for said transition duration in which the value of said second command signal is decreasingly controlled toward said second predetermined threshold and then said braking-force control is switched to said driving-force control when said second predetermined threshold is reached.

4. The system as claimed in claim 3, wherein said acceleration means comprises a throttle actuator which variably adjusts an opening angle of a throttle and said deceleration means comprises a brake actuator which supplies a controlled brake fluid pressure to wheel cylinders by an external fluid pressure source.

5. The system as claimed in claim 4, wherein said first and second arithmetic means calculate the respective values of said first and second command signals from equations:

$$\theta = Kp \times (V-Vd) + Ki \times \int (V-Vd)dt + Kd \times dV/dt$$

$$P = Ka \times (V-Vd) + Kb \times \int (V-Vd)dt + Kc \times dV/dt$$

where $\theta$ denotes the value of said first command signal indicative of the opening angle of the throttle, V denotes the vehicle speed detected by said detection means, Vd denotes said target vehicle speed, three coefficients Kp, Ki and Kd denote said first group of control gains, P denotes the value of said second command signal indicative of said controlled brake fluid pressure, and three coefficients Ka, Kb and Kc denote said second group of control gains.

6. An automatic speed control system for an automotive vehicle, comprising:

detection means for detecting a vehicle speed of the vehicle;

acceleration means for providing an increased acceleration exerted on the vehicle by automatically adjusting a driving force applied to road wheels;

main deceleration means fluidly connected to a hydraulic brake system for providing an increased deceleration exerted on the vehicle by automatically adjusting a braking force applied to the road wheels;

auxiliary deceleration means for producing an auxiliary braking force applied to the road wheels without utilizing the hydraulic brake system;

first arithmetic means for calculating a value of a first command signal to be sent to said acceleration means, based on a target vehicle speed and the vehicle speed detected by said detection means;

second arithmetic means for calculating a value of a second command signal to be sent to said main deceleration means, based on said target vehicle speed and the vehicle speed detected by said detection means;

third arithmetic means for calculating a value of a third command signal to be sent to said auxiliary deceleration means, based on said target vehicle speed and the vehicle speed detected by said detection means; and decision means for switching from one of a driving-force control of said acceleration means and an auxiliary braking-force control of said auxiliary deceleration means to another, and for switching from one of said auxiliary braking-force control of said auxiliary deceleration means and a braking-force control of said main deceleration means to another, so that, during said driving-force control, said driving-force control is continued until the value of said first command signal reaches a first predetermined threshold and said driving-force control is switched to said auxiliary braking-force control when said first predetermined threshold is reached, and so that, during said auxiliary braking force control, said auxiliary braking-force control is continued until the value of said third command signal reaches one of the upper and lower predetermined thresholds and said auxiliary braking-force control is switched to said driving-force control when said upper predetermined threshold is reached and to said braking-force control when said lower predetermined threshold is reached, and so that, during said braking-force control, said braking-force control is continued until the value of said second command signal reaches a second predetermined threshold and said braking-force control is switched to said auxiliary braking-force control when said second predetermined threshold is reached, during a simultaneous occurrence of said first command signal having a value greater than said first predetermined threshold and said third command signal having a value greater than said lower predetermined threshold or during a simultaneous occurrence of said second command signal having a value greater than said second predetermined threshold and said third command signal having a value greater than said upper predetermined threshold.

7. The system as claimed in claim 6, wherein said acceleration means comprises a throttle actuator which variably adjusts an opening angle of a throttle, and said main deceleration means comprises a brake actuator which supplies a controlled brake fluid pressure to wheel cylinders by an external fluid pressure source, and said auxiliary deceleration means comprises an automatic gearchange system which automatically changes a gear ratio.

8. The system as claimed in claim 6, wherein said acceleration means comprises a throttle actuator which variably adjusts an opening angle of a throttle, and said main deceleration means comprises a brake actuator which supplies a controlled brake fluid pressure to wheel cylinders by an external fluid pressure source, and said auxiliary deceleration means comprises an exhaust brake system which constricts a flow of exhaust gases coming from an engine to increase an exhaust back pressure.

9. The system as claimed in claim 6, wherein said acceleration means comprises a throttle actuator which variably adjusts an opening angle of a throttle, and said main deceleration means comprises a brake actuator which supplies a controlled brake fluid pressure to wheel cylinders by an external fluid pressure source, and said auxiliary deceleration means comprises an electric retarder which converts a part of the driving torque to electric energy.

10. An automatic speed control system for an automotive vehicle, comprising:

detection means for detecting a vehicle speed of the vehicle;

acceleration means for providing an increased acceleration exerted on the vehicle by automatically adjusting a driving force applied to road wheels;

main deceleration means for providing an increased deceleration exerted on the vehicle by automatically adjusting a braking force applied to the road wheels;

auxiliary deceleration means for producing an auxiliary braking force applied to the road wheels without utilizing the hydraulic brake system;

first arithmetic means for calculating a value of a first command signal to be sent to said acceleration means, based on a target vehicle speed and the vehicle speed detected by said detection means;

second arithmetic means for calculating a value of a second command signal to be sent to said main deceleration means, based on said target vehicle speed and the vehicle speed detected by said detection means;

third arithmetic means for calculating a value of a third command signal to be sent to said auxiliary deceleration means, based on said target vehicle speed and the vehicle speed detected by said detection means; and decision means for switching from one of a driving-force control of said acceleration means and an auxiliary braking-force control of said auxiliary deceleration means to another, and for switching from one of said auxiliary braking-force control of said auxiliary deceleration means and a braking-force control of said main deceleration means to another;

wherein a first group of control gains used in said first arithmetic means and a third group of control gains used in said third arithmetic means are preset to provide first transition durations between said driving-force control and said auxiliary braking-force control in which said first command signal having a value greater than a first predetermined threshold and said third command signal having a value greater than a lower predetermined threshold occur concurrently, and said third group of control gains used in said third arithmetic means and a second group of control gains used in said second arithmetic means are preset to provide second transition durations between said auxiliary braking-force control and said braking-force control in which said third command signal having a value greater than an upper predetermined threshold and said second command signal having a value greater than a second predetermined threshold occur concurrently, wherein said decision means selectively outputs one of said first, second and third command signals to continue the corresponding one of said driving-force control, said auxiliary driving-force control and said braking-force control, executed prior to a transition, for each of said first and second transition durations.

11. An automatic speed control system for an automotive vehicle, comprising:

detection means for detecting a vehicle speed of the vehicle;

acceleration means for providing an increased acceleration exerted on the vehicle by automatically adjusting a driving force applied to road wheels;

main deceleration means for providing an increased deceleration exerted on the vehicle by automatically adjusting a braking force applied to the road wheels;

auxiliary deceleration means for producing an auxiliary braking force applied to the road wheels without utilizing the hydraulic brake system;

first arithmetic means for calculating a value of a first command signal to be sent to said acceleration means, based on a target vehicle speed and the vehicle speed detected by said detection means;

second arithmetic means for calculating a value of a second command signal to be sent to said main deceleration means, based on said target vehicle speed and the vehicle speed detected by said detection means;

third arithmetic means for calculating a value of a third command signal to be sent to said auxiliary deceleration means, based on said target vehicle speed and the vehicle speed detected by said detection means; and decision means for switching from one of a driving-force control of said acceleration means and an auxiliary braking-force control of said auxiliary deceleration means to another, and for switching from one of said auxiliary braking-force control of said auxiliary deceleration means and a braking-force control of said main deceleration means to another;

wherein a first group of control gains used in said first arithmetic means and a third group of control gains used in said third arithmetic means are preset to provide first transition durations between said driving-force control and said auxiliary braking-force control in which said first command signal having a value greater than a first predetermined threshold and said third command signal having a value greater than a lower predetermined threshold occur concurrently, and said third group of control gains used in said third arithmetic means and a second group of control gains used in said second arithmetic means are preset to provide second transition durations between said auxiliary braking-force control and said braking-force control in which said third command signal having a value greater than an upper predetermined threshold and said second command signal having a value greater than a second predetermined threshold occur concurrently, wherein said driving-force control is continued for said first transition durations in which the value of said first command signal is decreasingly controlled toward said first predetermined threshold and then said driving-force control is switched to said auxiliary braking-force control when said first predetermined threshold is reached, and said auxiliary braking-force control is continued for said first transition durations in which the value of said third command signal is decreasingly controlled toward said lower predetermined threshold and then said auxiliary braking-force control is switched to said driving-force control when said lower predetermined threshold is reached, and wherein said auxiliary braking-force control is continued for said second transition durations in which the value of said third command signal is increasingly controlled toward said upper predetermined threshold and then said auxiliary braking-force control is switched to said braking-force control when said upper predetermined threshold is reached, and said braking-force control is continued for said second transition durations in which the value of said second command signal is decreasingly controlled toward said second predetermined threshold and then said braking-force control is switched to said auxiliary braking-force control when said second predetermined threshold is reached.

12. The system as claimed in claim 11, wherein each of said first and second transition durations is variable depending on a degree of a demand for acceleration or deceleration so that each of said first and second transition durations is reduced to a minimum in case of a high demand for acceleration or deceleration.

* * * * *